United States Patent
Kaneta et al.

(10) Patent No.: US 6,699,593 B2
(45) Date of Patent: Mar. 2, 2004

(54) CORROSION-RESISTANT METALLIC MEMBER, METALLIC SEPARATOR FOR FUEL CELL COMPRISING THE SAME, AND PROCESS FOR PRODUCTION THEREOF

(75) Inventors: Yasushi Kaneta, Nagoya (JP); Shinobu Takagi, Nagoya (JP); Hiroaki Yoshida, Nagoya (JP); Yoshihisa Suzuki, Nagoya (JP); Masaki Shinkawa, Nagoya (JP)

(73) Assignee: Daido Tokushuko Kabushiki Kaisha (JP)

( * ) Notice: Subject to any disclaimer, the term of this patent is extended or adjusted under 35 U.S.C. 154(b) by 0 days.

(21) Appl. No.: 10/084,434

(22) Filed: Feb. 28, 2002

(65) Prior Publication Data

US 2003/0068523 A1 Apr. 10, 2003

(30) Foreign Application Priority Data

| Feb. 28, 2001 | (JP) | ................................. P. 2001-055403 |
| Feb. 28, 2001 | (JP) | ................................. P. 2001-055565 |
| Jun. 8, 2001 | (JP) | ................................. P. 2001-173920 |
| Sep. 26, 2001 | (JP) | ................................. P. 2001-294487 |
| Sep. 27, 2001 | (JP) | ................................. P. 2001-295964 |

(51) Int. Cl.$^7$ .................. B32B 15/01; H01M 8/02; B05D 3/12
(52) U.S. Cl. ............... 428/670; 428/672; 428/925; 428/935; 428/938; 205/222; 427/337; 427/360; 427/367
(58) Field of Search ............... 428/670, 672, 428/673, 935, 938, 925; 205/222; 427/360, 367, 337, 347

(56) References Cited

U.S. PATENT DOCUMENTS

| 3,628,103 A | * | 12/1971 | Booe ........................ 361/516 |
| 3,676,214 A | * | 7/1972 | English et al. ............. 427/368 |
| 3,845,364 A | * | 10/1974 | Shoot ......................... 361/516 |
| 6,277,261 B1 | * | 8/2001 | Divisek et al. ............ 205/114 |
| 2001/0028974 A1 | * | 10/2001 | Nakata et al. ............. 429/34 |
| 2002/0072758 A1 | * | 6/2002 | Reo et al. .................. 606/153 |
| 2002/0164496 A1 | * | 11/2002 | Saloka et al. .............. 428/608 |

FOREIGN PATENT DOCUMENTS

| DE | 199 61 496 | | 7/2000 |
| GB | 711742 | | 7/1954 |
| GB | 1207970 | | 10/1970 |
| JP | 57-152489 | * | 9/1982 |
| JP | 03-068794 | * | 3/1991 |
| JP | 10-228914 | | 8/1998 |
| JP | 2000-21418 | | 1/2000 |
| JP | 2001-68129 | | 3/2001 |

* cited by examiner

Primary Examiner—John J. Zimmerman
(74) Attorney, Agent, or Firm—Bacon & Thomas, PLLC

(57) ABSTRACT

A highly corrosion-resistant material and a corrosion-resistant member which are improved in corrosion resistance, adhesion, contact electrical resistance, electrical conductivity, airtightness, etc. and are suitable for use as, e.g., a metallic separator for polymer electrolyte fuel cells (PEFC); and a process for producing them. A thin noble-metal layer is formed on the desired part of the surface of a metallic base and then subjected to compression working. The coated base may further be subjected to anticorrosive treatment with a liquid phase containing a peroxide or ozone or with an active gas atmosphere.

14 Claims, 7 Drawing Sheets

CORROSION-RESISTANT METALLIC MEMBER, METALLIC SEPARATOR FOR FUEL CELL COMPRISING THE SAME, AND PROCESS FOR PRODUCTION THEREOF

FIELD OF THE INVENTION

The present invention relates to a corrosion-resistant metallic material or member, a metallic separator for fuel cells which comprises the metallic member, and a process for producing them. More particularly, the invention relates to a highly corrosion-resistant material or member improved in corrosion resistance, adhesion, contact electrical resistance, electrical conductivity, airtightness, etc. and suitable for use as a metallic separator for polymer electrolyte fuel cells (PEFC), and to a process for producing the same.

DESCRIPTION OF THE RELATED ART

In applications where corrosion resistance is required, highly corrosion-resistant materials such as, e.g., stainless steel, nickel-based alloys, titanium, and titanium alloys have hitherto been used as they are, or materials obtained by plating steel, stainless steel, or the like with copper, nickel, chromium, or the like have been used. In applications where higher corrosion resistance is required, materials obtained by plating stainless steel or another base with a noble metal such as, e.g., gold or platinum have generally been used.

In producing plated products, plating is conducted after the base has been formed into the shape of the final product, because forming after plating may result in peeling of the deposit. There has hence been a problem that a film is less apt to be deposited by plating at corners such as groove edges and the plated product thus obtained has poor corrosion resistance in these parts.

Deposit films formed by plating have a porous structure and hence have poor adhesion to the base. In addition, since deposit films have pinholes, they have reduced corrosion resistance when they are thin. Although increasing the deposit thickness is necessary for heightening corrosion resistance, this poses a problem of increased cost in the case of noble-metal plating.

A metallic separator for polymer electrolyte fuel cells (PEFC) functions not only to electrically connect an electrode of a unit cell to an electrode of an adjacent unit cell but also to separate the reaction gas. The separator should therefore have high electrical conductivity and high gastightness, i.e., high impermeability to the reaction gas. Furthermore, the separator should have high corrosion resistance in the reactions in which hydrogen/oxygen is oxidized/reduced.

A metallic separator which has been known as a separator for polymer electrolyte fuel cells (PEFC) is one produced by a process comprising cutting a carbon plate such as a graphite plate to form therein many grooves arranged in corrugations for passing a fuel gas or oxidizing gas therethrough. This process, however, has a problem that the costs of the carbon plate material and the cutting are high, so that the separator produced by the process is too costly to be used practically.

Another metallic separator for polymer electrolyte fuel cells (PEFC) is disclosed in JP-A-10-228914. This separator is produced by pressing a stainless-steel plate to form therein many grooves arranged in corrugations for passing a fuel gas or oxidizing gas therethrough and then directly plating the edges of the protruding tips with gold in a thickness of from 0.01 to 0.02 $\mu$m.

JP-A-2000-21418 discloses a metallic separator produced by pressing an SUS 316 plate to form therein many grooves arranged in corrugations for passing a fuel gas or oxidizing gas therethrough and then subjecting the surface thereof to nickel strike, nickel plating, and gold plating.

The separators for fuel cells which have been proposed further include one produced by forming a metal plate into a given shape, depositing a thin metal layer on at least one side thereof, and then filling up the pinholes in the thin metal layer by roller pressing, anodization, or resin coating (see JP-A-2001-68129).

However, those techniques of the related art have problems that the corrosion-resistant metallic member produced still has insufficient corrosion resistance, that in some of the techniques, there are limitations on the materials of metals usable as the base, and that the production of the corrosion-resistant metallic member is laborious.

Furthermore, the technique of the related art in which a metal film is deposited by plating on a surface having grooves formed therein beforehand has a drawback that there are cases where voids remain between the deposit film and the stainless steel and where the deposit film has too small a thickness at the edges (corners) of the groove tops. In addition, there have been problems that since the deposit film has a porous structure, it has poor adhesion to the stainless steel, and that the stainless steel corrodes through the pinholes and pores of the deposit film.

SUMMARY OF THE INVENTION

An object of the present invention is to provide a highly corrosion-resistant inexpensive material which has no limitations on the materials of metals usable as the base, is improved in corrosion resistance, adhesion, contact electrical resistance, and other properties, and is usable as, e.g., a metallic separator for polymer electrolyte fuel cells (PEFC). Another object of the invention is to provide a process for producing the material.

Still another object of the invention is to provide a corrosion-resistant metallic member having high corrosion resistance and low electrical resistance and suitable for mass production. Further objects of the invention are to provide a metallic separator for fuel cells which comprises the metallic member, and to provide a process for producing the separator.

In order to eliminate the problems described above, attention was directed to the coating of a surface of a metallic base made of any desired material with a thin noble-metal layer having a dense structure and retaining high adhesion strength.

Intensive investigations were made in order to develop a corrosion-resistant material or corrosion-resistant member which is improved in corrosion resistance and contact electric resistance and is inexpensive, a metallic separator for polymer electrolyte fuel cells (PEFC) which comprises the corrosion-resistant material or member, and a process for producing the same. As a result, it has been found that when a base coated with a film of a noble metal deposited by plating or another technique is rolled together with the coating film, then not only almost the same adhesion strength as in clad metals is obtained but also the porous structure of the coating film is densified and pinholes are filled up, whereby corrosion resistance is improved. It was also found that since adhesion strength is enhanced, the coating film does not peel off even when passages for passing a fuel gas or oxidizing gas are formed thereafter by plastic working. The following have been further found.

Since corrosion resistance is improved, the thickness of the coating film can be reduced, leading to a cost reduction. Because of the surface coating layer made of a noble metal, the corrosion-resistant member has reduced contact electrical resistance. Furthermore, a preferred process for producing the corrosion-resistant member was found to comprise depositing a thin noble-metal layer on the desired part of the surface of a metallic base, compression-working the thin noble-metal layer, and then subjecting the coated base to an anticorrosive treatment with a liquid phase containing a peroxide or ozone or with an active gas atmosphere.

The present invention was accomplished based on these findings.

The invention provides a corrosion-resistant metallic member which comprises a metallic base and a thin noble-metal layer deposited on at least part of the metallic base and which has undergone compression working to reduce the total thickness of the base and the thin layer by 1% or more (preferably 5% or more).

The highly corrosion-resistant material (member) of the invention is preferably one which comprises a metallic material, e.g., an elemental metal selected from the group consisting of iron, nickel, titanium, copper, and aluminum or an alloy comprising at least one metal selected from said group, and deposited on a surface thereof a noble-metal layer made of, e.g., one metal selected from the group consisting of gold, platinum, palladium, silver, rhodium, and ruthenium, or an alloy comprising at least one metals selected from said group, and in which the base and the deposit layer has undergone compression working to reduce the total thickness of the base and the thin layer by 1% or more (preferably 5% or more).

The highly corrosion-resistant material (member) of the invention is more preferably one which comprises a metallic material, e.g., an elemental metal selected from the group consisting of iron, nickel, titanium, copper, and aluminum or an alloy comprising at least one metal selected from said group, and deposited on a surface thereof a noble-metal layer made of, e.g., one metal selected from the group consisting of gold, platinum, palladium, silver, rhodium, and ruthenium, or an alloy comprising at least one metals selected from said group, and in which the base and the deposit layer has undergone compression working to reduce the total thickness of the base and the thin layer by 1% or more (preferably 5% or more) and the work hardening resulting from the rolling has been removed by heating the clad metal under such conditions as not to diffuse and eliminate the noble-metal layer and as to be suitable for the base.

The invention further provides a process for producing a corrosion-resistant metallic member which comprises the steps of: depositing at least one noble metal on at least part of a metallic base to form a thin noble-metal layer; and compressing the resultant noble-metal-coated metallic material to reduce the total thickness of the base and the thin layer by 1% or more (preferably 5% or more).

The process of the invention for producing a highly corrosion-resistant material preferably comprises depositing one or more noble metals such as one metal selected from the group consisting of gold, platinum, palladium, silver, rhodium, and ruthenium, or an alloy comprising at least one metals selected from said group on a surface of a metallic material, e.g., an elemental metal selected from the group consisting of iron, nickel, titanium, copper, and aluminum or an alloy comprising at least one metal selected from said group, by plating or another technique and then compressing the base and the deposit layer at a draft of 1% or higher (preferably 5% or higher).

The process of the invention for producing a highly corrosion-resistant material more preferably comprises depositing one or more noble metals such as one metal selected from the group consisting of gold, platinum, palladium, silver, rhodium, and ruthenium, or an alloy comprising at least one metals selected from said group on a surface of a metallic material, e.g., an elemental metal selected from the group consisting of iron, nickel, titanium, copper, and aluminum or an alloy comprising at least one metal selected from said group, by plating or another technique, subsequently compressing the base and the deposit layer at a draft of 1% or higher (preferably 5% or higher), and then conducting a heat treatment in which the work hardening resulting from the rolling is removed under such conditions as not to diffuse and eliminate the noble-metal layer and as to be suitable for the base.

According to the highly corrosion-resistant material of the invention and the process of the invention for producing the same, a metallic material such as, e.g., an iron-based alloy and a coating film made of, e.g., one metal selected from the group consisting of gold, platinum, palladium, silver, rhodium, and ruthenium, or an alloy comprising at least one metals selected from said group, deposited on a surface thereof are rolled together to thereby clad the base. Because of this, not only almost the same adhesion strength as in clad metals is obtained, but also the porous structure of the noble-metal layer is densified and pinholes are filled up, whereby corrosion resistance is improved.

The improvement in corrosion resistance enables the thickness of the noble-metal layer, e.g., gold layer, to be reduced, leading to a cost reduction.

Due to the noble-metal layer, e.g., gold layer, deposited on the surface, the corrosion-resistant material has excellent corrosion resistance and reduced contact electrical resistance. In the case where the corrosion-resistant material has undergone a heat treatment, it further has excellent workability.

The invention furthermore provides a metallic separator for fuel cells which comprises the corrosion-resistant metallic member described above which has, on at least one of the front and back sides thereof, passages for enabling a fuel gas or oxidizing gas to flow therethrough.

The metallic separator for polymer electrolyte fuel cells (PEFC) of the invention is preferably one which comprises a metal plate made of, e.g., an elemental metal selected from the group consisting of iron, nickel, titanium, copper, and aluminum or an alloy comprising at least one metal selected from said group, and deposited on a surface thereof a noble-metal layer made of, e.g., one metal selected from the group consisting of gold, platinum, palladium, silver, rhodium, and ruthenium, or an alloy comprising at least one metals selected from said group, and in which the base and the deposit layer has undergone compression working to reduce the total thickness of the base and the thin layer by 1% or more (preferably 5% or more) and passages for passing a fuel gas or oxidizing gas therethrough have been formed by pressing or another technique.

The metallic separator for polymer electrolyte fuel cells (PEFC) of the invention is more preferably one which comprises a metal plate made of, e.g., an elemental metal selected from the group consisting of iron, nickel, titanium, copper, and aluminum or an alloy comprising at least one metal selected from said group, and deposited on a surface thereof a noble-metal layer made of, e.g., one metal selected from the group consisting of gold, platinum, palladium, silver, rhodium, and ruthenium, or an alloy comprising at least one metals selected from said group, and in which the base and the deposit layer has undergone compression working to reduce the total thickness of the base and the thin layer by 1% or more (preferably 5% or more), the work hardening in, e.g., the metal plate resulting from the rolling has been removed by heating the clad material under such conditions as not to diffuse and eliminate the coating film and as to be suitable for the base, and passages for passing a fuel gas or oxidizing gas therethrough have been formed by pressing or another technique.

A preferred process according to the invention for producing the metallic separator for polymer electrolyte fuel cells (PEFC) comprises depositing one or more noble metals such as one metal selected from the group consisting of gold, platinum, palladium, silver, rhodium, and ruthenium, or an alloy comprising at least one metals selected from said group on a surface of a metal plate made of, e.g., an elemental metal selected from the group consisting of iron, nickel, titanium, copper, and aluminum or an alloy comprising at least one metal selected from said group, subsequently compressing the base and the deposit layer at a draft of 1% or higher (preferably 5% or higher), and then subjecting the clad metal to working, e.g., pressing, to form passages for passing a fuel gas or oxidizing gas therethrough.

A more preferred process according to the invention for producing the metallic separator for polymer electrolyte fuel cells (PEFC) comprises depositing one or more noble metals such as one metal selected from the group consisting of gold, platinum, palladium, silver, rhodium, and ruthenium, or an alloy comprising at least one metals selected from said group on a surface of a metal plate made of, e.g., an elemental metal selected from the group consisting of iron, nickel, titanium, copper, and aluminum or an alloy comprising at least one metal selected from said group, compressing the base and the deposit layer at a draft of 1% or higher (preferably 5% or higher), subsequently conducting a heat treatment in which the work hardening in, e.g., the metal plate resulting from the rolling is removed under such conditions as not to diffuse or eliminate the coating film and as to be suitable for the base, and then subjecting the clad metal to working, e.g., pressing, to form passages for passing a fuel gas or oxidizing gas therethrough.

According to the metallic separator for polymer electrolyte fuel cells (PEFC) of the invention and the process for producing the same, a metal plate such as, e.g., a plate of an elemental metal selected from the group consisting of iron, nickel, titanium, copper, and aluminum or an alloy comprising at least one metal selected from said group and a coating film made of, e.g., one metal selected from the group consisting of gold, platinum, palladium, silver, rhodium, and ruthenium, or an alloy comprising at least one metals selected from said group, deposited on a surface thereof are rolled together to thereby clad the metal plate. Because of this, not only almost the same adhesion strength as in clad metals is obtained, but also the porous structure of the noble-metal layer is densified and pinholes are filled up, whereby corrosion resistance is improved.

The improvement in corrosion resistance enables the thickness of the noble-metal layer, e.g., gold layer, to be reduced, leading to a cost reduction.

Due to the noble-metal layer, e.g., gold layer, deposited on the surface, the metallic separator has excellent corrosion resistance and reduced contact electrical resistance. In the case where the metallic separator has undergone the heat treatment for removing work hardening, it further has excellent workability.

The corrosion-resistant metallic member (material) of the invention preferably comprises a metallic base and a thin noble-metal layer deposited on at least one of the front side and back side of the metallic base, wherein the adhesion strength between the metallic base and the thin noble-metal layer is preferably 50% or lower in terms of the amount of the layer peeling off in a peeling test after a corrosion test.

This metallic member can have high corrosion resistance and low contact resistance and can be easily mass-produced, because the thin noble-metal layer has been deposited on the front and/or back side of the metallic base at high adhesion strength. In case where the amount of coating layer peeling off exceeds 50%, the thin noble-metal layer has reduced adhesion strength and is apt to peel off and the metallic member hence deteriorates in corrosion resistance. Consequently, the amount thereof should be 50% or below, and is preferably 10% or below. The peeling test is conducted in accordance with JIS Z 0237. In this test, the areal proportion of the thin noble-metal layer peeled off with a tape is taken as the amount of coating layer peeling off. The corrosion test is conducted by holding the metallic member in a boiling sulfuric acid solution (atmosphere) having a pH of 2 for 168 hours. However, it is noted that this corrosion test is not intended to corrode the metallic base or noble metal.

The corrosion-resistant metallic member of the invention includes one in which the thin noble-metal layer has a thickness of from 0.1 to 100 nm and is constituted of a dense structure. In this metallic member, the thin noble-metal layer is less apt to peel off in the peeling test even when the metallic member has undergone the corrosion test. Consequently, corrosion resistance is maintained even when the noble-metal layer has a thickness smaller than in corrosion-resistant metallic members heretofore in use. Because of this, stable corrosion resistance can be obtained at low cost.

The reasons for the thickness range shown above are as follows. In case where the thickness of the thin noble-metal layer is smaller than 0.1 nm, the metallic member has reduced corrosion resistance and is unsuitable for practical use. On the other hand, thicknesses thereof exceeding 100 nm result in a cost increase. The preferred range of the thickness of the thin noble-metal layer is from 5 to 50 nm. The term "dense structure" used above means a metallic structure which is evenly adherent to the front/back side of the metallic base and is formed by compression-working the thin noble-metal layer which will be described later, such as, e.g., a noble-metal layer deposited by plating.

The corrosion-resistant metallic member of the invention further includes one in which the thin noble-metal layer deposited on at least one of the front and back sides of the metallic base has undergone compression working to reduce the total thickness of both (the metallic base and the thin noble-metal layer) by 1% or more (preferably 5% or more). According to this constitution, a corrosion-resistant member in which the thin noble-metal layer has been deposited on the front/back side of the metallic base at high adhesion strength so as to have a dense structure free from pinholes, pores, or the like can be provided without fail.

In case where the degree of compression in the compression working is lower than 1%, the thin noble-metal layer has insufficient adhesion strength. Consequently, the degree of compression should be 1% or higher, preferably 5% or more, and more preferably 10% or higher, most preferably 30% or higher. Examples of the compression working include rolling and pressing. In the rolling, the degree of compression is referred to as draft.

The corrosion-resistant metallic member of the invention still further includes one in which the thin noble-metal layer has been formed by depositing one metal selected from the group consisting of gold, platinum, palladium, silver, rhodium, and ruthenium, or an alloy comprising at least one metals selected from said group, on the metallic base by plating, screen printing, PVD, or CVD. According to this constitution, the thin noble-metal layer can be precisely deposited on the front/back side of the metallic base in a thickness of from 0.1 to 100 nm.

Examples of the PVD include vapor deposition, sputtering, and ion plating.

The corrosion-resistant metallic member of the invention furthermore includes one in which the metallic base comprises an elemental metal selected from the group consisting of iron, nickel, titanium, copper, and aluminum or an alloy comprising at least one metal selected from said group. According to this constitution, a corrosion-resistant metallic member is obtained which comprises a metallic base made of any of these materials and a thin noble-metal layer which has an extremely small thickness such as that shown above and has been deposited on the base at high adhesion strength so as to have a dense structure. Thus, the corrosion-resistant metallic member can be provided at an optimal cost according to various applications where high corrosion resistance and low electrical resistance are required.

On the other hand, the metallic separator for fuel cells of the invention preferably is one which comprises a metallic base and a thin noble-metal layer deposited on at least one of the front and back sides of the metallic base, and in which the adhesion strength between the metallic base and the thin noble-metal layer is 50% or lower in terms of the amount of the layer peeling off in a peeling test after a corrosion test.

In this constitution, the thin noble-metal layer has been deposited on the front/back side of the metallic base at high adhesion strength. Consequently, this metallic separator for fuel cells combines high corrosion resistance and low contact electrical resistance and is suitable for mass production.

The metallic separator for fuel cells of the invention includes one in which the thin noble-metal layer has a thickness of from 0.1 to 100 nm and is constituted of a dense structure. In this constitution, the noble-metal layer has a smaller thickness and a denser structure than in metallic separators heretofore in use. Consequently, a metallic separator for fuel cells which has high corrosion resistance and low contact resistance can be provided at low cost.

The metallic separator for fuel cells of the invention further includes one in which at least one of the front and back sides of the metallic base is coated with the thin noble-metal layer and has passages for enabling a fuel gas or oxidizing gas to flow therethrough.

According to this constitution, the highly corrosion-resistant thin noble-metal layer has been deposited at high adhesion strength over the front/back side having the passages, and the separator has low contact resistance. Consequently, this separator can have excellent dimensional accuracy with respect to the surface shape of the passage-bearing side which has a corrugated section, and is hence suitable for practical use.

The metallic separator for fuel cells of the invention still further includes one in which the metallic base and the thin noble-metal layer deposited on at least one of the front and back sides thereof have undergone compression working to reduce the total thickness of both (the metallic base and the thin noble-metal layer) by 1% or more (preferably 5% or more). In this separator, the thin noble-metal layer has been deposited on the front/back side of the metallic base so as to have a dense structure which attains high adhesion strength and high corrosion resistance.

The metallic separator for fuel cells of the invention furthermore includes one in which the thin noble-metal layer has been formed by depositing one metal selected from the group consisting of gold, platinum, palladium, silver, rhodium, and ruthenium, or an alloy comprising at least one metals selected from said group, by plating, screen printing, PVD, or CVD. This separator can be one in which the thin noble-metal layer has been precisely deposited on the front/back side of the metallic base in a thickness of from 0.1 to 100 nm.

The metallic separator for fuel cells of the invention furthermore includes one in which the metallic base comprises an elemental metal selected from the group consisting of iron, nickel, titanium, copper, and aluminum or an alloy comprising at least one metal selected from said group. This separator can be one which is relatively inexpensive and comprises a metallic base made of any of these materials and a thin noble-metal layer which has an extremely small thickness such as that shown above and has been deposited on the front/back side of the base at high adhesion strength so as to have a dense structure.

In each of the embodiments of the invention described above, it is preferred to further conduct an anticorrosive treatment with a liquid phase containing a peroxide or ozone or with an active gas atmosphere.

BRIEF DESCRIPTION OF THE DRAWINGS

The foregoing and other objects and advantages of the invention will be apparent from the following detailed description and the accompanying drawings, in which.

DETAILED DESCRIPTION OF THE INVENTION

Figure 1:
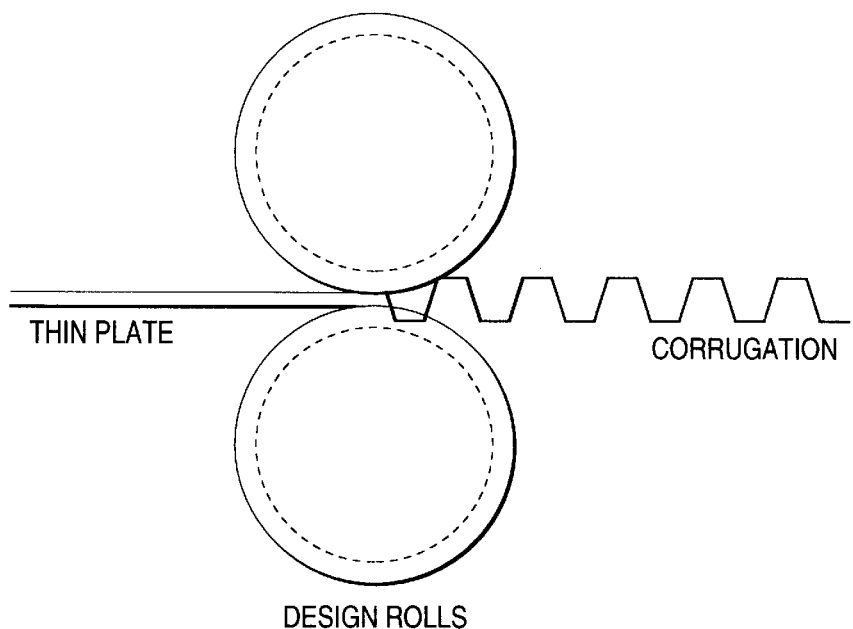
FIG. 1 is a diagrammatic view illustrating one example of methods for forming passages for passing a fuel gas or oxidizing gas in a metallic separator for polymer electrolyte fuel cells (PEFC) according to the invention.

The highly corrosion-resistant material of the invention and the process of the invention for producing the same will be explained below in detail.

First, the highly corrosion-resistant material of the invention is explained.

The highly corrosion-resistant material of the invention comprises a metallic material and a noble-metal layer formed on a surface thereof, wherein the metallic material and the noble-metal layer have undergone compression at a draft of 1% or higher (preferably 5% or higher) or wherein the metallic material and the noble-metal layer have undergone the rolling and further undergone a heat treatment by which the work hardening resulting from the rolling has been removed. Examples of the metallic material include iron, iron-based alloys, nickel, nickel-based alloys, titanium, titanium-based alloys, copper, copper-based alloys, aluminum, and aluminum-based alloys, etc.

With respect to the iron-based alloys, nickel-based alloys, titanium-based alloys, copper-based alloys, and aluminum-based alloys, the amount of the element(s) other than the base matal(s) may preferably 50% by weight or less, more preferably 30% by weight or less, and most preferably 20% by weight or less, based on the total weight of the alloy. Examples of the alloy include Fe—Cr—Ni (e.g., Fe-19 wt % Cr-12 wt % Ni) and Ni—Cr (e.g., Ni-20 wt % Cr).

Preferred of these are iron-based alloys, nickel-based alloys, titanium, and titanium-based alloys from the standpoints of corrosion resistance, strength, etc. Most preferred of the iron-based alloys are ferritic stainless steels including SUS 430 and austenitic stainless steels including SUS 304 and SUS 316 because they have excellent corrosion resistance and are advantageous in workability and cost. Examples of the shape of the metallic material include plate, square, section, and bar.

The noble-metal layer formed on a surface of the metallic material consists of one layer or two or more superposed layers, wherein each layer is made of an elemental noble metal selected, for example, from gold, silver, platinum, palladium, rhodium, ruthenium, iridium, and osmium or an alloy thereof, i.e., an alloy of two or more of these noble metals or an alloy of one or more of these with other one or more base metals. The noble-metal layer has been deposited on the side desired.

With respect to the alloys of gold, silver, platinum, palladium, rhodium, ruthenium, iridium, and osmium, the amount of the element(s) other than the base matal(s) may preferably 50% by weight or less, more preferably 30% by weight or less, and most preferably 10% by weight or less, based on the total weight of the alloy. Examples of the alloy include AU—Co (e.g., Au-1 wt % Co), Au—Pd (e.g., Au-4 wt % Pd), Au—Fe (e.g., Au-2 wt % Fe), Au—Ni (e.g., Au-3 wt % Ni), Au—Ag (Au-5 wt % Ag), Ag—Pd (e.g., Ag-30 wt % Pd), Au—Ag—Cu (e.g., Au-10 wt % Ag-15 wt % Cu), etc.

Preferred of those noble metals are gold, silver, platinum, palladium, rhodium, and ruthenium or an alloy thereof (more preferably, gold, silver, platinum, palladium, and alloys of these metals) from the standpoints of corrosion resistance, suitability for film formation, suitability for rolling, cost, etc. In applications where plastic working is conducted after noble-metal layer formation and low contact electrical resistance is required, gold and platinum are most preferred because they are excellent in spreadability and corrosion resistance and have a high electrical conductivity.

With respect to the thickness of the noble-metal layer formed on a surface of the metallic material, it may be unmeasurably small as long as the layer has been evenly deposited on the surface, in applications where abrasion does not occur as in the case of metallic separators for polymer electrolyte fuel cells (PEFC). However, the thickness of the noble-metal layer after rolling is preferably 0.001 μm or larger from the standpoint of corrosion resistance. Although the upper limit of the thickness thereof varies depending on applications, it is about 1.0 μm in applications where abrasion does not occur. In applications where the highly corrosion-resistant material may abrade during use, the noble-metal layer should have a larger thickness.

Methods for forming the noble-metal layer, methods for rolling, and methods for heat treatment will be explained below with regard to the process for producing a highly corrosion-resistant material.

Next, the process of the invention for producing a highly corrosion-resistant material is explained.

The process of the invention for producing a highly corrosion-resistant material comprises depositing at least one noble metal such as, e.g., one metal selected from the group consisting of gold, platinum, palladium, silver, rhodium, and ruthenium, or an alloy comprising at least one metals selected from said group, on a surface of a metallic material and compressing the metallic material and the noble-metal layer at a draft of 1% or higher (preferably 5% or higher), and may further include a heat treatment for removing the work hardening in, e.g., the metallic material resulting from the rolling. The metallic material, noble-metal layer, and thickness of the noble-metal layer are the same as described above.

Examples of methods for depositing one or more noble metals (methods for forming a noble-metal layer) on a surface of the metallic material include PVD such as vapor deposition, sputtering, and ion plating, CVD, and plating such as electroplating and electroless plating. However, electroplating is preferred because it is easy and inexpensive.

Figure 2:
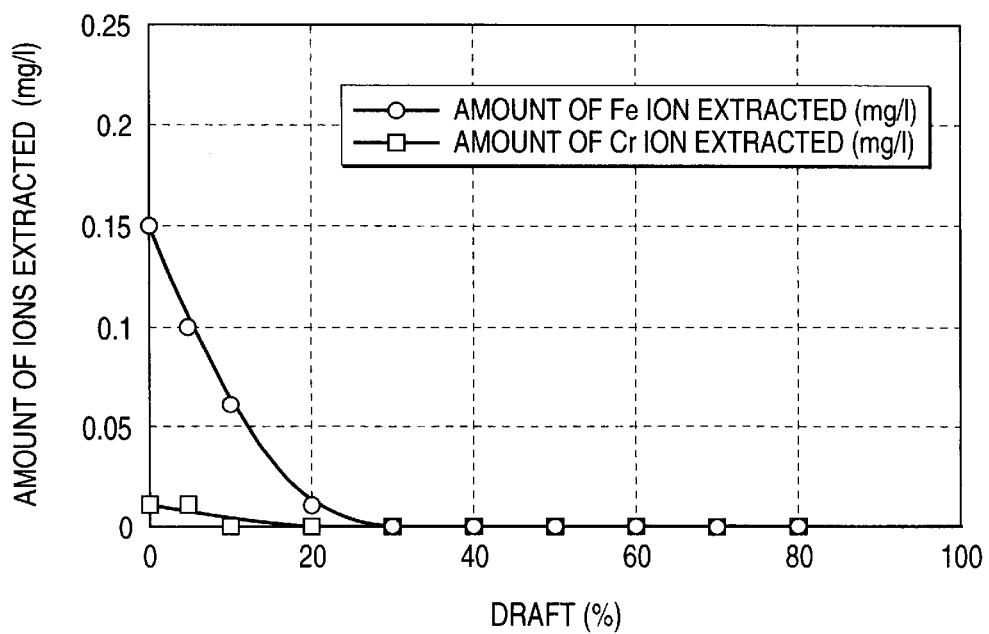
FIG. 2 is a graph showing the relationship between draft in rolling and the amount of ions extracted from a material obtained by plating an SUS 430 plate with gold.

The rolling is conducted for the purposes of not only enabling the coating film of at least one noble metal, e.g., one metal selected from the group consisting of gold, platinum, palladium, silver, rhodium, and ruthenium, or an alloy comprising at least one metals selected from said group, deposited on a surface of the metallic material to tightly adhere thereto but also densifying the porous structure of the coating film and filling up pinholes to thereby improve corrosion resistance. The rolling can be conducted with ordinary pressure rolls. In order for the rolling to produce these effects, it should be conducted at a draft of 1% or higher, preferably 5% or higher, more preferably 30% or higher, as shown in FIG. 2. This is because the amount of iron ions extracted decreases abruptly when the draft is increased to 1% or above, and is less than 0.01 mg/L when the draft is 30% or higher.

Figure 3:
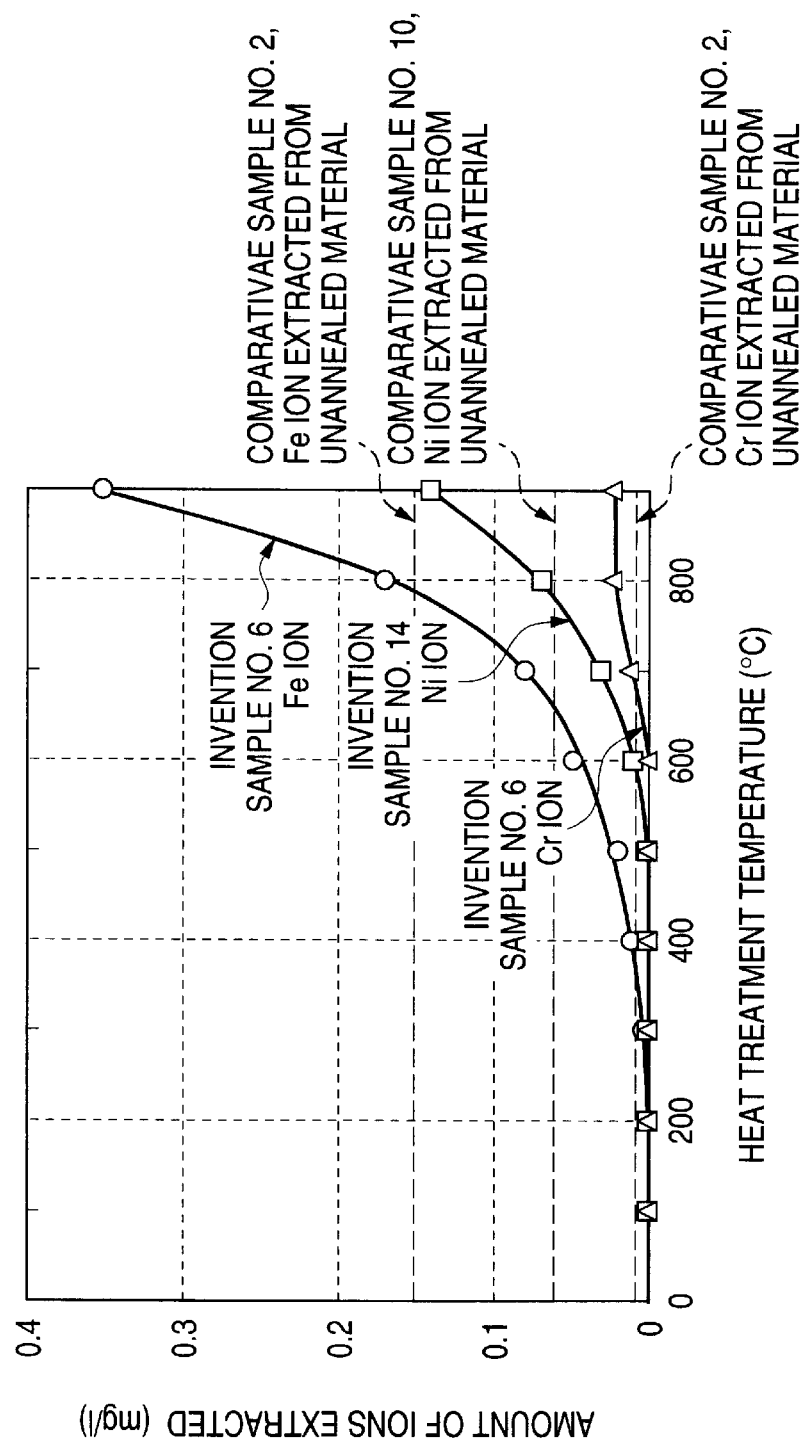
FIG. 3 is a graph showing the relationship between heat treatment temperature and the amounts of ions extracted from materials obtained by plating an SUS 430 plate or 80Ni-20Cr plate with gold.

The heat treatment is conducted for the purpose of removing the work hardening resulting from the rolling to thereby improve workability and other properties. Although temperatures for this treatment are not particularly limited, the heat treatment may be conducted at the following temperatures. In the case where the metallic material is iron, an iron-based alloy, nickel, or a nickel-based alloy, the work hardening can be removed by conducting the softening treatment at 700° C. or lower as shown in FIG. 3. In the case where the metallic material is titanium or a titanium-based alloy, copper or a copper-based alloy, or aluminum or an aluminum-based alloy, the work hardening can be removed by conducting the softening treatment at 700° C. or lower, 500° C. or lower, or 300° C. or lower, respectively, although these treatments are not shown in FIG. 3. After the heat treatment, the extraction of iron, nickel, etc. from the metallic material is little.

Applications of the highly corrosion-resistant material of the invention include metallic separators for polymer electrolyte fuel cells (PEFC), electronic materials, electronic parts, chemical apparatus such as electrochemical apparatus, decorative articles, and Buddhist altar fittings.

The metallic separator for polymer electrolyte fuel cells (PEFC) of the invention, among the applications enumerated above, and processes for producing the separator will be explained below in more detail.

First, the metallic separator for polymer electrolyte fuel cells (PEFC) of the invention is explained.

The metallic separator for polymer electrolyte fuel cells (PEFC) of the invention comprises a metal plate and a noble-metal layer formed on a surface thereof. In this separator, the metal plate and the noble-metal layer have undergone compression at a draft of 1% or higher (preferably 5% or higher) to clad the metal plate and passages for passing a fuel gas or oxidizing gas therethrough have been formed by pressing or another technique. Alternatively, the metal plate and the noble-metal layer have undergone the rolling for cladding and further undergone a heat treatment by which the work hardening resulting from the rolling has been removed, and passages for passing a fuel gas or oxidizing gas therethrough have been formed by pressing or another technique. Examples of the metal plate include plates of iron and iron-based alloys, plates of nickel and nickel-based alloys, plates of titanium and titanium-based alloys, plates of copper and copper-based alloys, and plates of aluminum and aluminum-based alloys. Preferred of these are plates of iron-based alloys, plates of nickel-based alloys, and plates of titanium and titanium-based alloys from the standpoints of corrosion resistance, strength, etc. Most preferred of the iron-based alloys are ferritic stainless steels including SUS 430 and austenitic stainless steels including SUS 304 and SUS 316 because they have excellent corrosion resistance and are advantageous in workability and cost. The metal plate has a thickness of generally about from 0.05 to 1.0 mm.

The noble-metal layer formed on a surface of the metal plate consists of one layer or two or more superposed layers, wherein each layer is made of an elemental noble metal selected, for example, from gold, silver, platinum, palladium, rhodium, ruthenium, iridium, and osmium or an alloy thereof, i.e., an alloy of two or more of these noble metals or an alloy of one or more of these with other one or more base metals. The noble-metal layer has been deposited usually on each of the front and back sides.

Preferred of those noble metals are gold, silver, platinum, palladium, and alloys of these metals from the standpoints of corrosion resistance, suitability for film formation, suitability for rolling, cost, etc. Most preferred of these are gold and platinum because they are excellent in corrosion resistance and spreadability and have a high electrical conductivity.

With respect to the thickness of the noble-metal layer made of, e.g., gold, platinum, palladium, silver, or an alloy of these formed on a surface of the metal plate, it may be unmeasurably small as long as the layer has been evenly deposited on the surface, because the separator does not abrade during use. However, the thickness of the noble-metal layer after rolling is preferably 0.001 $\mu$m or larger from the standpoint of corrosion resistance. Although the upper limit of the thickness thereof is not particularly limited, it is preferably 1.0 $\mu$m from the standpoints of cost, etc.

In the metallic separator for polymer electrolyte fuel cells (PEFC) of the invention, the passages for passing a fuel gas or oxidizing gas therethrough usually have a width of from 1 to 3 mm and a depth of from 0.5 to 3.0 mm and have been formed with a pitch of from 2 to 6 mm. The passages can be formed by pressing, rolling with two design rolls such as those shown in FIG. 1, or another technique.

Methods for forming the noble-metal layer, methods for rolling, and methods for heat treatment will be explained below with regard to processes for producing the metallic separator for polymer electrolyte fuel cells (PEFC).

Processes for producing the metallic separator for polymer electrolyte fuel cells (PEFC) of the invention will be explained next.

One process for producing the metallic separator for polymer electrolyte fuel cells (PEFC) of the invention comprises depositing at least one noble metal on a surface of a metal plate, compressing the metal plate and the noble-metal layer at a draft of 1% or higher (preferably 5% or higher), and forming passages for passing a fuel gas or oxidizing gas therethrough. Another process comprises conducting the rolling to clad the metal plate, subsequently conducting a heat treatment for removing the work hardening in, e.g., the metal plate resulting from the rolling, and then forming passages for passing a fuel gas or oxidizing gas therethrough. The metal plate, noble metal, and thickness of the noble-metal layer are the same as described above, and explanations thereon are omitted here.

Examples of methods for depositing one or more noble metals (methods for forming a noble-metal layer) on a surface of the metal plate include PVD such as vapor deposition, sputtering, and ion plating, CVD, and plating such as electroplating and electroless plating. Although any of these techniques may be used, electroplating is preferred because it is easy and inexpensive.

The rolling is conducted for the purposes of not only enabling the coating film of at least one noble metal deposited on a surface of the metal plate to tightly adhere thereto but also densifying the porous structure of the coating film and filling up pinholes to thereby improve corrosion resistance. The rolling can be conducted with ordinary pressure rolls. In order for the rolling to produce these effects, it should be conducted at a draft of 1% or higher, preferably 5% or higher, more preferably 30% or higher, as shown in FIG. 2. This is because the amount of iron or other ions extracted from the metal plate decreases abruptly when the draft is increased to 1% or above, and is less than 0.01 mg/L when the draft is 30% or higher.

The passages for passing a fuel gas or oxidizing gas, i.e., for passing a fuel gas or an oxidizing gas or for passing both a fuel gas and an oxidizing gas, can be formed by pressing with a die having a shape corresponding to the passages. Alternatively, the passages may be formed with two grooved design rolls in the manner shown in FIG. 1.

The heat treatment is conducted for the purpose of removing the work hardening resulting from the rolling to thereby improve workability and other properties. Although temperatures for this treatment are not particularly limited, the heat treatment may be conducted at the following temperatures. In the case where the metal plate is iron, an iron-based alloy, nickel, or a nickel-based alloy, the work hardening can be removed by conducting the softening treatment at 700° C. or lower as shown in FIG. 3. In the case where the metal plate is titanium or a titanium-based alloy, copper or a copper-based alloy, or aluminum or an aluminum-based alloy, the work hardening can be removed by conducting the softening treatment at 700° C. or lower, 500° C. or lower, or 300° C. or lower, respectively, although these treatments are not shown in FIG. 3. After the heat treatment, the extraction of metal ions from the metal plate is little.

Preferred embodiments of the invention will be further explained below by reference to drawings.

Figure 6A:
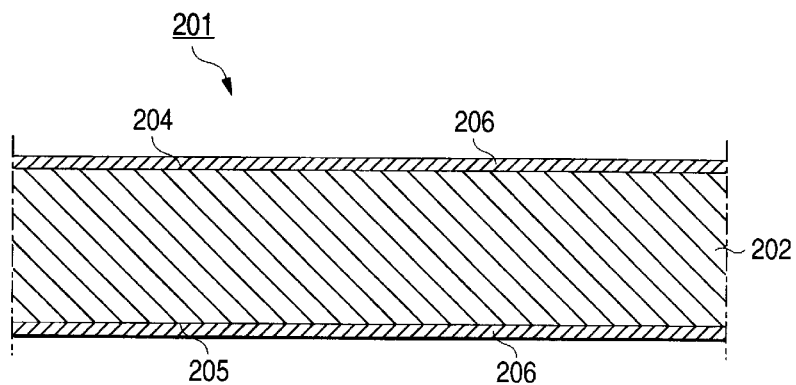
FIG. 6A is a diagrammatic sectional view of a corrosion-resistant metallic member according to the invention.

FIG. 6A shows a sectional view of a corrosion-resistant metallic member 201 according to the invention. As shown in the figure, this corrosion-resistant metallic member comprises a metallic base 202 and thin noble-metal layers 206 deposited respectively on the front and back sides 204 and 205 thereof.

The metallic base 202 is a metal plate having a thickness of about from 0.01 mm to several millimeters made of an elemental metal selected from the group consisting of iron, nickel, titanium, copper, and aluminum or an alloy comprising at least one metal selected from said group (e.g., stainless steel). The thin layers 206 are made of one metal selected from the group consisting of gold, platinum, palladium, silver, rhodium, and ruthenium, or an alloy comprising at least one metals selected from said group. The layers 206 have been deposited on the front and back sides 204 and 205 of the metallic base 202 by plating, screen printing, PVD (e.g., vapor deposition, sputtering, or ion plating), or CVD.

The thin layers 206 have a thickness of from 0.1 to 100 nm. They have undergone compression working at a degree of compression of 1% or higher (preferably 5% or higher), and hence have a dense structure. Furthermore, the thin layers 206 have such an adhesion strength that the amount of the layers peeling off in a peeling test conducted after the metallic member 201 has undergone a corrosion test is 50% or less, preferably 10% or less.

Figure 6B:
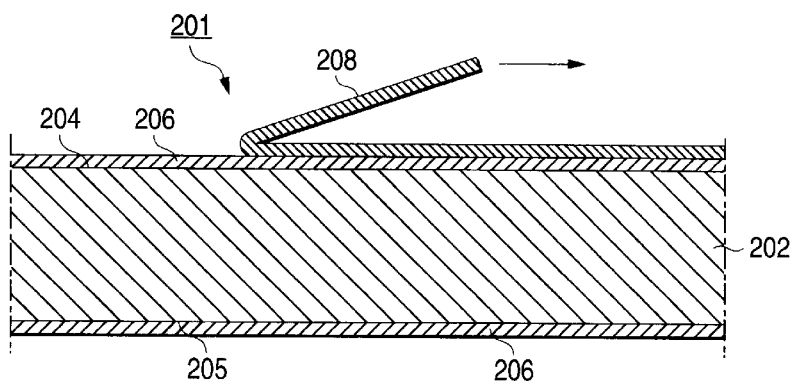
FIG. 6B is a diagrammatic view illustrating a peeling test of the metallic member.

The peeling test is conducted in accordance with JIS Z 0237 in the following manner. The corrosion-resistant metallic member 201 is subjected to a corrosion test in which the member 201 is held in a boiling sulfuric acid solution (atmosphere) having a pH of 2 for 168 hours, subsequently washed with ultrapure water. After acetone replacement, the member 201 is dried. Immediately thereafter, as shown in FIG. 6B, a pressure-sensitive adhesive tape 208 is applied to the surface of each thin layer 206 and then stripped therefrom in a direction parallel to the front or back side 204 or 205. The amount of the thin layer 206 which has been transferred to the pressure-sensitive adhesive tape 208 stripped (proportion of the area of the layer peeled off) is preferably 50% or less, more preferably 10% or less.

Figure 6C:
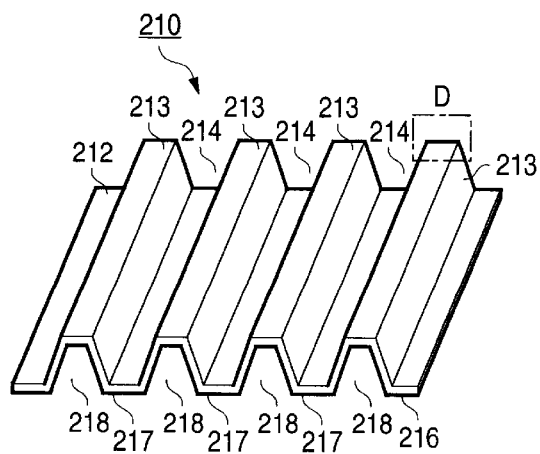
FIG. 6C is a diagrammatic view illustrating an important part of a metallic separator for fuel cells according to the invention.

FIG. 6C shows an important part of a metallic separator 210 of the invention for fuel cells.

This separator 210 is based on, e.g., a stainless steel (SUS 304L). It has been obtained by shaping the corrosion-resistant metallic member 201 so as to have a corrugated section as shown in the figure by the method which will be described later. The separator 210 hence has, on each of the front side 212 and back side 216 thereof, passages 214 or 218, which are parallel grooves, and ridges 213 or 217 located therebetween. As shown in the enlarged view of FIG. 6D, the front side 212 and back side 216, which have the passages 214 and 218, each are evenly coated with the thin noble-metal layer 206 having a thickness of from 0.1 to 100 nm. These thin noble-metal layers 206 have undergone compression working at a degree of compression of 1% or higher (preferably 5% or higher) and, hence, have a dense structure and the adhesion strength shown above.

Because of this, the separator 210 has high corrosion resistance and low contact electrical resistance and is capable of passing a fuel gas or oxidizing gas through the passages 214 and 218 formed on the front and back sides 212 and 216 thereof. Consequently, stacking such separators 210 in the thickness direction while interposing electrolyte films and other members therebetween realizes at low cost a solid polymer electrolyte fuel cell having high corrosion resistance and low contact electrical resistance.

Figure 7A:
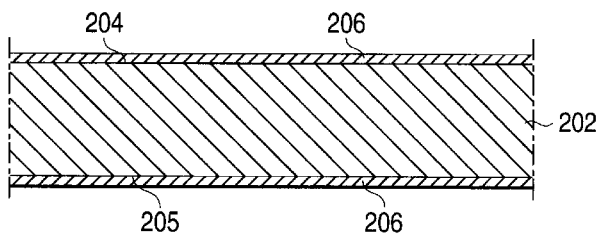
FIGS. 7A and 7B are diagrammatic views illustrating a process for producing a corrosion-resistant metallic member according to the invention.
Figure 7B:
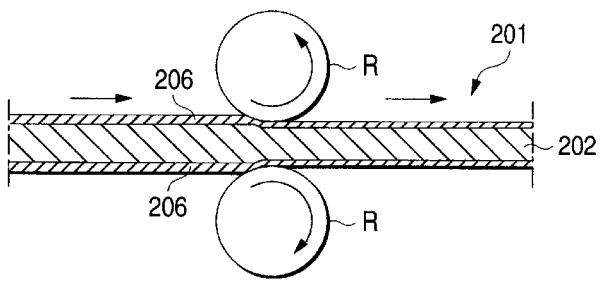

FIGS. 7A and 7B show a typical process for producing the corrosion-resistant metallic member 201.

First, a metallic base 202 made of, e.g., a stainless steel (SUS 304L) is electroplated on the front and back sides 204 and 206 to thereby form deposit layers (thin layers) 206 of a noble metal (e.g., gold) having a thickness of about 100 nm or smaller, as shown in FIG. 7A.

Subsequently, the metallic base 202 having the deposit layers 206 and 206 is passed through the nip between a pair of plain rollers R and R, as shown in FIG. 7B, at a draft (degree of compression) of 1% or higher (preferably 5% or higher) based on the total thickness. Thus, rolling for cladding (compression working) is conducted. As a result, the metallic base 202 is coated on the front and back sides 214 and 215 respectively with thin noble-metal layers 206 and 206 which have a dense structure free from pores and the like and have such an adhesion strength that the amount of coating layer peeling off in the peeling test after the corrosion test is 50% or less (preferably 10% or less). Thus, corrosion-resistant metallic member 201 can be obtained. The draft is preferably 10% or higher, more preferably 30% or higher, and the upper limit thereof is 90%. For the compression working, a pressing machine or a hot press may, for example, be used.

Figure 6D:
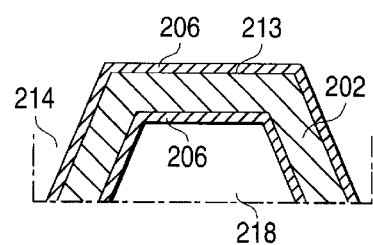
FIG. 6D is a partial enlarged view of the part D surrounded by the dot-and-dash line in FIG. 6C.
Figure 7C:
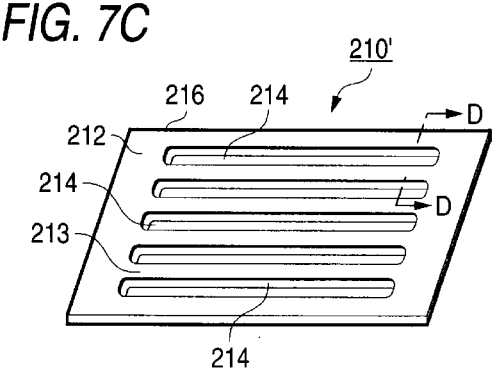
FIGS. 7C and 7E are slant views each illustrating a metallic separator for fuel cells which was obtained by shaping the metallic member.
Figure 7D:
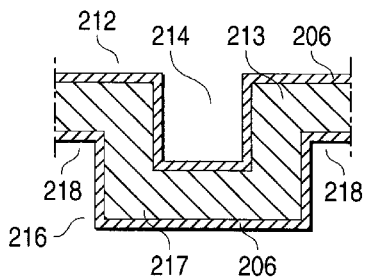
FIGS. 7D and 7F each are an enlarged sectional view taken on the line D—D in FIG. 7C or line F—F in FIG. 7E.

FIGS. 7C and 7D show a metallic separator 210' for fuel cells which is obtained by roughly corrugating the corrosion-resistant metallic member 201 and then finish-pressing it and which is similar to the separator shown in FIGS. 6A and 6D. This separator 210' has, on each of the front and back sides 212 and 216 thereof, parallel passages 214 or 218 having a nearly rectangular section. The passages 214 or 218 have been formed over the whole surface on each side other than peripheral areas. As shown in FIG. 7D, the front and back sides 212 and 216 including the passages 214 and 218 are almost evenly coated with thin noble-metal layers 206 having a thickness of from 0.1 to 100 nm. The thin layers 206 have undergone the rolling for cladding (compression working) and, hence, have a dense structure and the adhesion strength shown above.

Figure 7E:
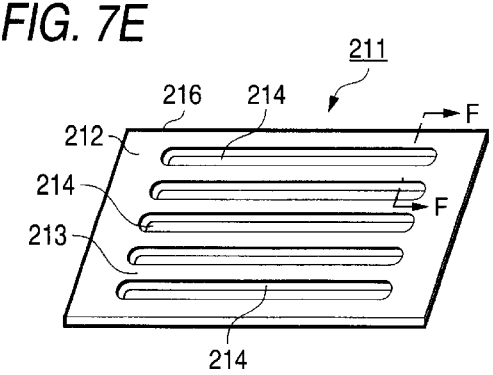
Figure 7F:
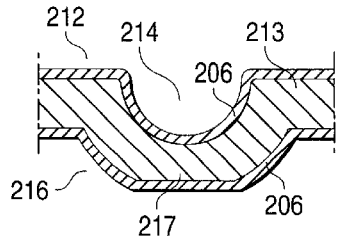

FIGS. 7E and 7F show a metallic separator 211 for fuel cells which is obtained by roughly corrugating the corrosion-resistant metallic member 201 and then finish-pressing it with a different die. This separator 211 has, on each of the front and back sides 212 and 216 thereof, parallel passages 214 or 218 having a nearly semicircular section. The passages 214 or 218 have been formed over the whole surface of each side other than peripheral areas. The ridges 217 each have a flat top for facilitating stacking.

Figure 8A:
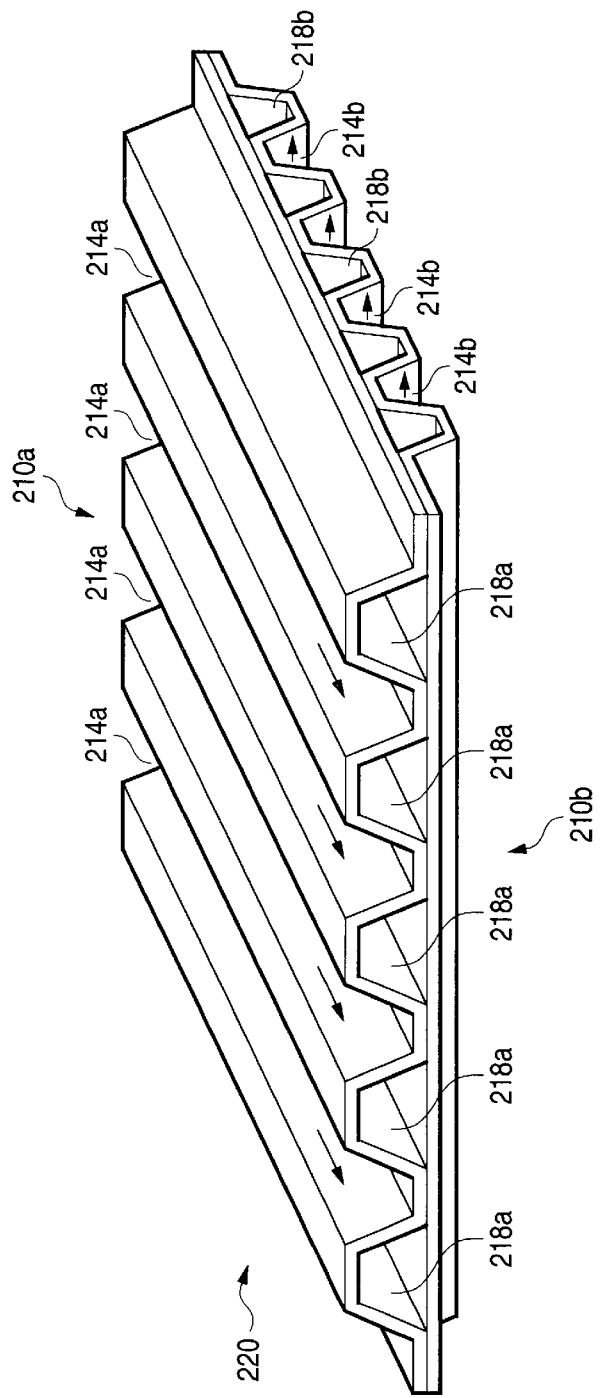
FIGS. 8A and 8B are a slant view and a side view, respectively, of a metallic separator for fuel cells which is one form of application.
Figure 8B:
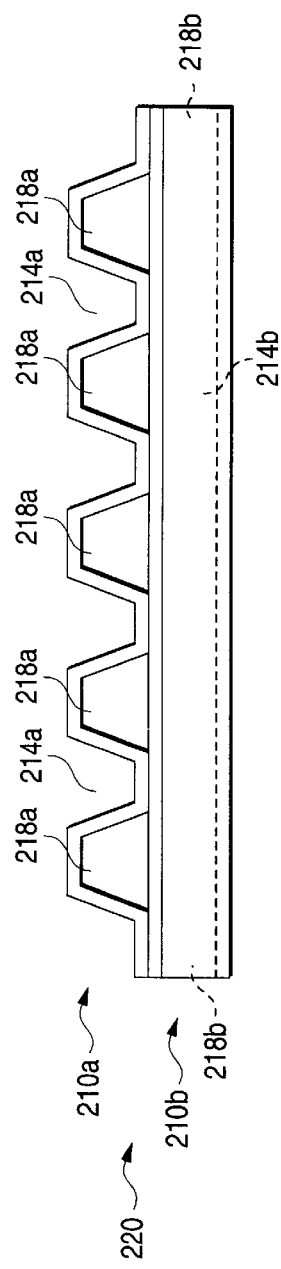

FIGS. 8A and 8B show a metallic separator 220 for fuel cells which comprises a pair of separators 210 described above; this metallic separator 220 is one form of application of the corrosion-resistant metallic member of the invention. Separators 210a and 210b on each of which thin noble-metal layers 206 have been deposited respectively on the front and back sides 212 and 216 through steps including those shown in FIGS. 7A and 7B are stacked in the thickness direction in such a manner that the passages of one separator are aligned perpendicularly to those of the other as shown in FIGS. 8A and 8B. Subsequently, the separators 210a and 210b are united with each other by fixing the ridges of one separator 210a or 210b to the ridges of the other, which are in areal contact with those ridges, by brazing, welding, etc.

As a result, the cross-flow type metallic separator 220 for fuel cells is obtained, in which as shown in FIGS. 8A and 8B the parallel passages 214a and 214a having a nearly trapezoidal section in one unit separator 210a are perpendicular to the parallel passages 214b and 214b having a nearly trapezoidal section in the other unit separator 210b.

A further explanation will be given below on an embodiment in which a corrosion-resistant metallic member which has undergone compression working is subjected to an anticorrosive treatment with a liquid system containing a peroxide or ozone or to an anticorrosive treatment with an active gas atmosphere.

First, a thin noble-metal layer is formed on the desired part of the surface of a metallic base. The metallic base is not particularly limited in shape or material, and may be suitably selected according to the intended use of the corrosion-resistant metallic member to be obtained. However, it is preferred to use a metallic plate material from the standpoints of formability, workability, profitability, productivity, etc. It is also preferred to use a plate material made of one metal selected from iron, nickel, titanium, copper, and aluminum or an alloy comprising at least one metal selected from these metals. More preferred of these is a plate material made of a stainless steel. In the case of using a metallic plate material as the metallic base, a thin noble-metal layer is formed usually on the desired part on one side thereof, or on each side thereof if desired. However, in the case where a corrosion-resistant metallic member for use as a separator for fuel cells is to be obtained, a thin noble-metal layer is formed at least on the desired part on that side of the base which is to be in contact with an electrode.

The thin noble-metal layer to be formed on the desired part of the surface of the metallic base also is not particularly limited, and a suitable material may be selected according to the intended use of the corrosion-resistant metallic member to be obtained. It is, however, preferred from the standpoints of corrosion resistance, electrical conductivity, durability, productivity, etc. that the thin layer be made of one metal selected from gold, platinum, palladium, silver, rhodium, and ruthenium or an alloy comprising at least one of these metals. Techniques for forming the thin noble-metal layer also are not particularly limited. However, at least one technique selected from plating, screen printing, PVD, and CVD is preferred for the same reasons. Of these, plating is especially preferred. Although the thickness of the thin noble-metal layer also is not particularly limited, it is preferably from 0.1 to 100 nm, more preferably from 1 to 100 nm, most preferably from 1 to 50 nm, especially from the standpoint of corrosion resistance.

In this process of the invention for producing a corrosion-resistant metallic member, the structure thus obtained by forming a thin noble-metal layer is then compression-worked. In this step, the thin noble-metal layer only may be compression-worked, or both the thin noble-metal layer and the metallic base may be compression-worked. In the latter case, the compression working can be conducted, for example, with pressure rolls. The compression working not only improves the adhesion of the thin noble-metal layer to the metallic base but also densifies the thin noble-metal layer itself and reduces the number and size of the pinholes and the like formed in the thin noble-metal layer. The degree of compression working is not particularly limited. However, the degree of compression is 1% or higher, preferably 5% or higher, more preferably from 5 to 60%, from the standpoints of enhancing adhesion, accelerating densification, and sufficiently reducing the number and size of pinholes and the like. The degree of compression in the compression working of, for example, a metallic base having a thin noble-metal layer formed thereon is the value determined by using the equation:

Degree of compression=$\{1-(T_1/T_0)\} \times 100$ wherein $T_0$ is the thickness of the base material and thin layer before the compression working and $T_1$ is the thickness thereof after the compression working.

Finally in this process of the invention for producing a corrosion-resistant metallic member, the structure which has been compression-worked is subjected to an anticorrosive treatment with a liquid phase containing a peroxide or ozone or an anticorrosive treatment with an active gas atmosphere. Even in the structure which has undergone the compression working described above, small pinholes and other defects including those invisible to the naked eye remain in the thin noble-metal layer, and the metallic base is exposed in such pinholes and the like and hence corrodes in these exposed areas. Consequently, an anticorrosive treatment is conducted to oxidize the exposed surface and thereby obtain a corrosion-resistant metallic member having improved corrosion resistance.

Specifically, the anticorrosive treatment with a liquid phase containing a peroxide or ozone is accomplished by immersing the structure which has undergone the compression working to a liquid phase containing a peroxide or ozone. Examples of the peroxide used here include peroxides of the $M_2O_2$ type (wherein M is H, Na, K, $NH_4$, Ag, etc.), $MO_2$ type (wherein M is Ca, Sr, Ba, Zn, etc.), and $MO_3 \cdot nH_2O$ type (wherein M is Ti, etc.), and further include peroxosulfuric acid and salts of the $M_2S_2O_8$ type (wherein M is H, Na, K, $NH_4$, etc.), peroxophosphoric acid and salts of the $M_4P_2O_8$ type (wherein M is H, K, etc.), peroxocarbonic acid salts of the $M_2CO_4$ type (wherein M is Na, K, etc.) or $M_2C_2O_6$ type (wherein M is Na, K, $NH_4$, etc.), peroxoboric acid salts of the $MBO_3$ type (wherein M is Na, K, etc.), and urea/hydrogen peroxide adducts of the $CO(NH_2)_2 \cdot H_2O_2$ type. Preferred of these is hydrogen peroxide from the standpoints of profitability, productivity, etc.

The liquid phase containing such a peroxide or ozone is basically comprises the peroxide or ozone and a solvent in which the peroxide or ozone is dissolved or dispersed. As this solvent can be used a solvent suitable for the peroxide or ozone. Examples thereof include water, alcohols, and mixtures thereof. Besides these ingredients, an alkali or an acid may be further incorporated according to need. In a liquid phase regulated with an alkali, e.g., NaOH or KOH, or an acid, e.g., HCl or $H_2SO_4$, so as to be alkaline or acid, especially alkaline, the oxidizing ability of the peroxide or ozone is enhanced. The higher the concentration of the peroxide or ozone in the liquid phase or the higher the temperature of the liquid phase, the more the oxidizing ability of the peroxide or ozone is enhanced. From the standpoint of operation, however, the anticorrosive treatment is preferably conducted at a temperature lower than the boiling point of the solvent constituting the liquid phase.

The anticorrosive treatment with an active gas atmosphere is conducted in the following manner. Even in the structure which has undergone the compression working described above, small pinholes and other defects including those invisible to the naked eye remain in the thin noble-metal layer, and the metallic base is exposed in such pinholes and the like and hence corrodes in these exposed areas. Consequently, an anticorrosive treatment is conducted to oxidize, nitride, carbonize, fluorinate, or otherwise treat the exposed parts and thereby obtain a corrosion-resistant metallic member having improved corrosion resistance. This anticorrosive treatment is conducted in an active gas atmosphere. Although a suitable active gas atmosphere can be selected according to the intended use of the corrosion-resistant metallic member to be obtained, it is preferred to use an atmosphere of a plasma of a working gas, e.g., air, oxygen gas, nitrogen gas, hydrocarbon gas, or carbon fluoride gas, or an ozone gas atmosphere from the standpoints of corrosion resistance, durability, productivity, etc. The temperature for this anticorrosive treatment is preferably 300° C. or lower from the standpoint of preventing the noble metal, which constitutes the thin noble-metal layer, from diffusing into the metallic base. When the structure which has been compression-worked is subjected to the anticorrosive treatment with an active gas atmosphere, the active gas penetrates into pinholes remaining in the thin noble-metal layer after the compression working, even into pinholes invisible to the naked eye. As a result, even those parts of the metallic base which are exposed in such minute pinholes can be protected from corrosion through oxidation, nitriding, carbonization, fluorination, etc.

The process of the invention for producing a corrosion-resistant metallic member was explained above. However, forming into a desired shape may be further conducted in the invention according to the intended use of the corrosion-resistant metallic member to be obtained. In the case where a corrosion-resistant metallic member for use as a separator for fuel cells is to be produced, a forming step is conducted to form feed openings, passages, and discharge openings for a fuel gas comprising $H_2$ or to form feed openings, passages, and discharge openings for an oxidizing gas comprising $O_2$. Although this forming step may be conducted at any stage in the process of the invention for producing a corrosion-resistant metallic member, it is preferably conducted after the compression working and before the anticorrosive treatment or conducted after the anticorrosive treatment, from the standpoints of corrosion resistance, durability, productivity, etc.

The corrosion-resistant metallic member of the invention is obtained by the process of the invention described above. Among the typical examples thereof are separators for fuel cells, in particular, separators between which two electrodes holding a solid polymer electrolyte film interposed therebetween are sandwiched, i.e., separators for polymer electrolyte fuel cells (PEFC).

Figure 9:
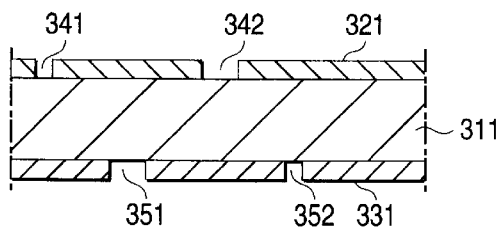
FIG. 9 is a partial sectional view diagrammatically illustrating a structure obtained by forming a thin metal layer on each side of a platy metallic base in a process of the invention for producing a corrosion-resistant metallic member.
Figure 10:
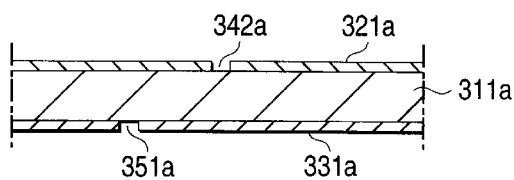
FIG. 10 is a partial sectional view diagrammatically illustrating a structure obtained by compression-working the structure shown in FIG. 9 in the process of the invention for producing a corrosion-resistant metallic member.
Figure 11:
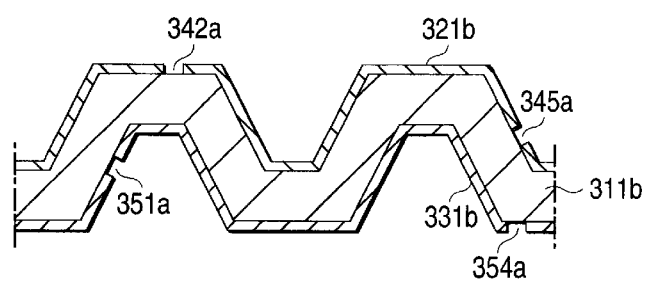
FIG. 11 is a partial sectional view diagrammatically illustrating a structure obtained by corrugating the structure shown in FIG. 10 in the process of the invention for producing a corrosion-resistant metallic member.
Figure 12:
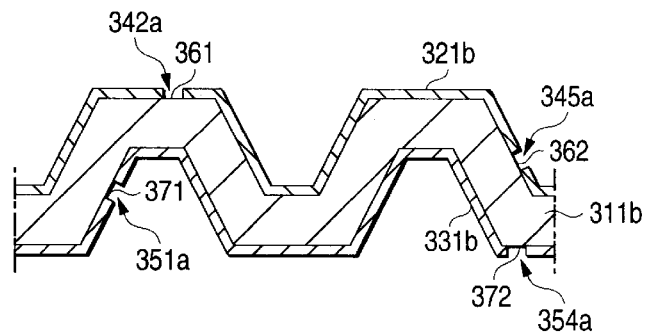
FIG. 12 is a partial sectional view diagrammatically illustrating a structure obtained by subjecting the structure shown in FIG. 11 to an anticorrosive treatment in the process of the invention for producing a corrosion-resistant metallic member.

FIGS. 9 to 12 are partial sectional views diagrammatically illustrating the structures obtained in respective steps in a process for producing a corrosion-resistant metallic member in which either an anticorrosive treatment with a liquid phase containing a peroxide or ozone or an anticorrosive treatment with an active gas atmosphere is conducted after compression working. Specifically, FIG. 9 shows a structure obtained by forming a thin metal layer on each side of a platy metallic base, and FIG. 10 shows a structure obtained by compression-working the structure shown in FIG. 9. FIG. 11 shows a structure obtained by corrugating the structure shown in FIG. 10, and FIG. 12 shows a structure obtained by subjecting the structure shown in FIG. 11 to an anticorrosive treatment. Consequently, FIGS. 9 to 12, in this order, illustrate the procedure of a process of the invention for producing a corrosion-resistant metallic member. FIG. 12 serves also as a partial sectional view diagrammatically illustrating a corrosion-resistant metallic member according to the invention.

As shown in FIG. 9, when thin noble-metal layers 321 and 331 are formed respectively on both sides of a metallic base 311, for example, by plating, the thin noble-metal layers 321 and 331 formed have many pinholes 341, 342, . . . and 351, 352, . . . of various sizes. When the structure shown in FIG. 9 is compression-worked, for example, with pressure rolls, then the metallic base 311 is compressed to become a metallic base 311a and the thin noble-metal layers 321 and 331 are compressed to become thin noble-metal layers 321a and 331a, respectively, as shown in FIG. 10. Through the compression working, the thin noble-metal layers 321 and 331 thus become thin noble-metal layers 321a and 331a, respectively, which are tenaciously adherent to the metallic base 311a and have been densified. Furthermore, the many pinholes 341, 342, . . . and 351, 352, . . . of various sizes formed in the thin noble-metal layers 321 and 331 are diminished to leave a small number of small pinholes 342a, . . . and 351a, . . .

When the structure shown in FIG. 10 is corrugated, the metallic base 311a becomes a corrugated metallic base 311b and the thin noble-metal layers 321a and 331a likewise become corrugated thin noble-metal layers 321b and 331b, respectively, as shown in FIG. 11. The pinholes 342a, and 351a, . . . in the thin noble-metal layers 321a and 331a remain substantially unchanged as pinholes 342a, 345a, and 351a, 354a, . . . in the thin noble-metal layers 321b and 331b. Consequently, the metallic base 311b is exposed in these pinholes 342a, 345a, . . . and 351a, 354a, . . .

When the structure shown in FIG. 11 is subjected to an anticorrosive treatment by immersion in, e.g., an aqueous solution of hydrogen peroxide or to an anticorrosive treatment with an atmosphere of an oxygen gas plasma, then an oxide 361, 362, . . . and 371, 372, . . . is formed on those parts of the metallic base 311b which are exposed in the pinholes 342a, 345a, . . . and 351a, 354a, . . . , as shown in FIG. 12. FIG. 12 shows part of a separator for fuel cells as an embodiment of the corrosion-resistant metallic member according to the invention, although a whole view is omitted. The valleys of the thin noble-metal layer 321b are connected to one another at the front-side or rear-side ends thereof so that they are arranged in series as a whole. A gas feed opening has been formed at the valley located at the right-hand end, and a gas discharge opening has been formed at the valley located at the left-hand end. This separator is used in such a manner that the tops of the ridges of the thin noble-metal layer 321b are in close contact with an electrode and an $H_2$ containing fuel gas, for example, flows from the gas feed opening through the valleys connected in series to the gas discharge opening.

The invention will be explained below in more detail by reference to Examples.

EXAMPLE 1

A coating film of a noble metal or alloy having the thickness shown in Table 1 was formed by electroplating on each side of an SUS 430 plate having a thickness of 0.3 mm. This metal plate and the coating film were rolled together at any of the drafts shown in Table 1 to clad the metal plate. Thus, samples having a noble-metal layer were produced as inventive samples and comparative samples. Test pieces for a hardness test, contact electrical resistance test, adhesion strength test, and corrosion resistance test were cut out of these samples. The metal plates were examined for surface hardness. An adhesion strength test, contact electrical resistance test, and corrosion resistance test were conducted by the following methods. The results obtained are shown in Table 1. Furthermore, with respect to inventive samples Nos. 1 to 9 and comparative sample No. 1, the relationship between draft in the rolling and the results of the corrosion resistance test is shown in FIG. 2.

In Table 1, "Ag/Pd" means an alloy of 70% silver and 30% palladium.

(1) Corrosion Resistance Test 0.4 L of 0.1 wt % sulfuric acid solution (pH 2) was kept boiling with refluxing. A test piece having dimensions of 40×50 mm was held in this atmosphere for 168 hours. Thereafter, the metal ions which had been extracted with the solution were analyzed by atomic absorption spectrophotometry. The amounts thereof are expressed in terms of weight per liter of the solution.

(2) Adhesion Strength Test

Figure 4:
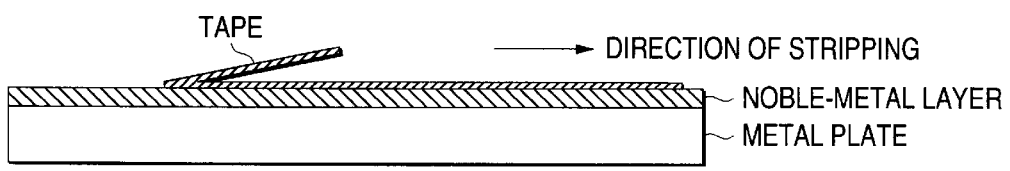
FIG. 4 is a diagrammatic view illustrating the method of adhesion strength test conducted in the Examples of the invention.

A test piece which had undergone the corrosion resistance test was evaluated immediately after the test in the following manner. The surface of this test piece was washed with ultrapure water, which was then replaced with acetone. This test piece was dried. A pressure-sensitive adhesive tape having a width of 18 mm and a length of 50 mm was applied to the noble-metal layer side of the dry test piece and adhered thereto by sufficiently rubbing a fingernail against it. As shown in FIG. 4, one end of the pressure-sensitive adhesive tape was slightly lifted up and pulled to strip the tape in a moment in a direction almost parallel to the plane of the noble-metal layer. The results were judged based on the following criteria. When at least part of the noble-metal layer was transferred even slightly to the pressure-sensitive adhesive tape, this sample was rated as X. When no noble-metal layer was transferred to the tape, this sample was rated as ◯.

(3) Contact Electrical Resistance Test

Figure 13:
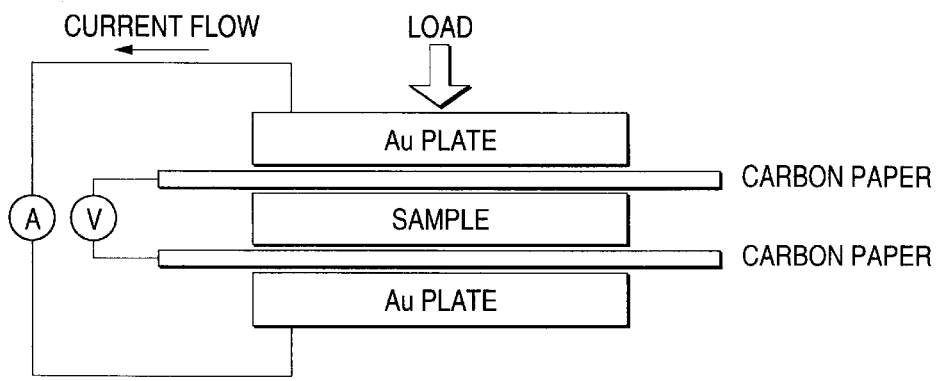
FIG. 13 illustratively shows how the contact electrical resistance was measured in Examples.

A test piece having dimensions of 17×17 mm was sandwiched between carbon papers. A current of 90 mA was caused to flow through the sandwich under a load of 235 N/cm$^2$ and the resultant voltage was measured to determine the contact electrical resistance, as shown in FIG. 13 (the same shall apply to the following same tests).

TABLE 1

| | | Metal plate | | Coating film | | | Heat treatment temperature | Hardness before heat treatment | Hardness after heat treatment | Adhesion strength | Contact electrical resistance | Corrosion resistance test (mg/L) | |
|---|---|---|---|---|---|---|---|---|---|---|---|---|---|
| | No. | Material | Thickness (mm) | Material | Thickness (μm) | Draft (%) | (° C.) | (HV) | (HV) | | (mΩ·cm$^2$) | Fe | Cr |
| Inventive sample | 1-0 | SUS430 | 0.3 | Au | 0.1 | 1 | — | 162 | — | ◯ | 6.6 | 0.13 | 0.01 |
| | 1 | SUS430 | 0.3 | Au | 0.1 | 5 | — | 189 | — | ◯ | 6.6 | 0.10 | 0.01 |
| | 2 | SUS430 | 0.3 | Au | 0.1 | 10 | — | 213 | — | ◯ | 6.6 | 0.06 | <0.01 |
| | 3 | SUS430 | 0.3 | Au | 0.1 | 20 | — | 230 | — | ◯ | 6.6 | 0.01 | <0.01 |
| | 4 | SUS430 | 0.3 | Au | 0.1 | 30 | — | 244 | — | ◯ | 6.9 | <0.01 | <0.01 |
| | 5 | SUS430 | 0.3 | Au | 0.1 | 40 | — | 254 | — | ◯ | 6.9 | <0.01 | <0.01 |
| | 6 | SUS430 | 0.3 | Au | 0.1 | 50 | (700) | 265 | (175) | ◯ | 6.9 | <0.01 | <0.01 |
| | 7 | SUS430 | 0.3 | Au | 0.1 | 60 | — | 275 | — | ◯ | 7.2 | <0.01 | <0.01 |
| | 8 | SUS430 | 0.3 | Au | 0.1 | 70 | — | 283 | — | ◯ | 7.5 | <0.01 | <0.01 |
| | 9 | SUS430 | 0.3 | Au | 0.1 | 80 | — | 294 | — | ◯ | 7.5 | <0.01 | <0.01 |
| | 10 | SUS430 | 0.3 | Pt | 0.1 | 50 | — | 265 | — | ◯ | 9.0 | <0.01 | <0.01 |
| | 11 | SUS430 | 0.3 | Ag | 0.1 | 50 | — | 264 | — | ◯ | 7.2 | <0.01 | <0.01 |
| | 12 | SUS430 | 0.3 | Pd | 0.1 | 50 | — | 265 | — | ◯ | 8.4 | <0.01 | <0.01 |
| | 13 | SUS430 | 0.3 | Ag/Pd | 0.1 | 50 | — | 256 | — | ◯ | 7.8 | <0.01 | <0.01 |
| Comparative sample | 1 | SUS430 | 0.3 | none | — | 0 | — | 150 | — | — | 106 | 0.35 | 0.02 |
| | 2 | SUS430 | 0.3 | Au | 0.2 | 0 | — | 151 | — | X | 6.6 | 0.15 | 0.01 |
| | 3 | SUS430 | 0.3 | Au | 0.5 | 0 | — | 150 | — | X | 6.6 | 0.10 | 0.01 |
| | 4 | SUS430 | 0.3 | Pt | 0.1 | 0 | — | 152 | — | X | 8.7 | 0.18 | 0.01 |
| | 5 | SUS430 | 0.3 | Pt | 0.5 | 0 | — | 151 | — | X | 8.7 | 0.18 | 0.01 |
| | 6 | SUS430 | 0.3 | Ag | 0.1 | 0 | — | 152 | — | X | 6.9 | 0.20 | 0.01 |
| | 7 | SUS430 | 0.3 | Pd | 0.1 | 0 | — | 153 | — | X | 8.1 | 0.18 | 0.01 |
| | 8 | SUS430 | 0.3 | Ag/Pd | 0.1 | 0 | — | 152 | — | X | 7.5 | 0.18 | 0.01 |

\* Ag/Pd in the column Material under Coating Film means an alloy of 70% Ag and 30% Pd.
\* In inventive sample 6, the heat treatment temperature and the hardness after heat treatment are reference values, and the values of corrosion resistance test, etc. are results for test pieces which had not undergone heat treatment.
\* In inventive sample 1-0, the extracted amount of Fe was 0.13 mg/L, but the noble-metal layer peeling was not observed due to the compression treatment.

EXAMPLE 2

A coating film of a noble metal or alloy having the thickness shown in Table 2 was formed by electroplating on each side of an 80Ni-20Cr plate or pure-titanium plate each having a thickness of 0.3 mm. This metal plate and the coating film were rolled together at any of the drafts shown in Table 2 to clad the metal plate. Thus, samples having a noble-metal layer were produced as inventive samples and comparative samples. Test pieces for a hardness test, contact electrical resistance test, adhesion strength test, and corrosion resistance test were cut out of these samples in the same manner as in Example 1. The metal plates were examined for surface hardness. An adhesion strength test, contact electrical resistance test, and corrosion resistance test were conducted by the methods described above. The results obtained are shown in Table 2.

electrical resistance test and a corrosion resistance test by the following methods. The results obtained are shown in Table 3.

(1) Contact Electrical Resistance Test

A test piece of the metallic separator for polymer electrolyte fuel cells (PEFC), which had dimensions of 32×32 mm (effective contact area, 3.20 cm$^2$), was sandwiched between carbon papers. A current of 100 mA (current density, 31 mA/cm$^2$) was caused to flow through the sand-

TABLE 2

| | | Metal plate | | Coating film | | | Heat treatment | Hardness before | Hardness after | | Contact | Corrosion resistance | | |
|---|---|---|---|---|---|---|---|---|---|---|---|---|---|---|
| | | | Thickness | | Thickness | Draft | temperature | heat treatment | heat treatment | Adhesion | electrical resistance | test (mg/L) | | |
| | No. | Material | (mm) | Material | (μm) | (%) | (° C.) | (HV) | (HV) | strength | (mΩ · cm$^2$) | Ni | Cr | Ti |
| Inventive sample | 14 | 80Ni—20Cr | 0.3 | Au | 0.1 | 50 | (600) | 370 | (179) | ○ | 7.5 | <0.01 | <0.01 | — |
| | 15 | 80Ni—20Cr | 0.3 | Pt | 0.1 | 60 | — | 371 | — | ○ | 9.0 | <0.01 | <0.01 | — |
| | 16 | 80Ni—20Cr | 0.3 | Ag | 0.1 | 50 | — | 371 | — | ○ | 7.8 | <0.01 | <0.01 | — |
| | 17 | 80Ni—20Cr | 0.3 | Pd | 0.1 | 50 | — | 388 | — | ○ | 9.0 | <0.01 | <0.01 | — |
| | 18 | 80Ni—20Cr | 0.3 | Ag/Pd | 0.1 | 50 | — | 368 | — | ○ | 8.4 | <0.01 | <0.01 | — |
| | 19 | pure Ti | 0.3 | Au | 0.1 | 50 | — | 203 | — | ○ | 6.9 | — | — | <0.01 |
| | 20 | pure Ti | 0.3 | Pt | 0.1 | 50 | — | 209 | — | ○ | 8.7 | — | — | <0.01 |
| | 21 | pure Ti | 0.3 | Ag | 0.1 | 50 | — | 206 | — | ○ | 7.2 | — | — | <0.01 |
| | 22 | pure Ti | 0.3 | Pd | 0.1 | 50 | — | 204 | — | ○ | 8.4 | — | — | <0.01 |
| | 23 | pure Ti | 0.3 | Ag/Pd | 0.1 | 50 | — | 207 | — | ○ | 7.8 | — | — | <0.01 |
| Comparative sample | 9 | 80Ni—20Cr | 0.3 | none | — | 0 | — | 175 | — | — | 18.2 | 0.14 | 0.01 | — |
| | 10 | 80Ni—20Cr | 0.3 | Au | 0.1 | 0 | — | 174 | — | X | 7.2 | 0.06 | <0.01 | — |
| | 11 | 80Ni—20Cr | 0.3 | Au | 0.5 | 0 | — | 176 | — | X | 6.9 | 0.02 | <0.01 | — |
| | 12 | 80Ni—20Cr | 0.3 | Pt | 0.1 | 0 | — | 177 | — | X | 9.0 | 0.04 | <0.01 | — |
| | 13 | 80Ni—20Cr | 0.3 | Pt | 0.5 | 0 | — | 176 | — | X | 9.0 | 0.02 | <0.01 | — |
| | 14 | 80Ni—20Cr | 0.3 | Ag | 0.1 | 0 | — | 175 | — | X | 7.5 | 0.10 | 0.01 | — |
| | 15 | 80Ni—20Cr | 0.3 | Pd | 0.1 | 0 | — | 177 | — | X | 8.1 | 0.08 | 0.01 | — |
| | 16 | 80Ni—20Cr | 0.3 | Ag/Pd | 0.1 | 0 | — | 174 | — | X | 8.4 | 0.08 | 0.01 | — |
| | 17 | pure Ti | 0.3 | none | — | 0 | — | 112 | — | — | 407 | — | — | <0.01 |
| | 18 | pure Ti | 0.3 | Au | 0.1 | 0 | — | 113 | — | X | 25.7 | — | — | <0.01 |
| | 19 | pure Ti | 0.3 | Au | 0.5 | 0 | — | 110 | — | X | 12.4 | — | — | <0.01 |
| | 20 | pure Ti | 0.3 | Pt | 0.1 | 0 | — | 112 | — | X | 32.4 | — | — | <0.01 |
| | 21 | pure Ti | 0.3 | Ag | 0.1 | 0 | — | 110 | — | X | 26.9 | — | — | <0.01 |
| | 22 | pure Ti | 0.3 | Pd | 0.1 | 0 | — | 112 | — | X | 30.6 | — | — | <0.01 |
| | 23 | pure Ti | 0.3 | Ag/Pd | 0.1 | 0 | — | 112 | — | X | 28.9 | — | — | <0.01 |

* Ag/Pd in the column Material under Coating Film means an alloy of 70% Ag and 30% Pd.
* In inventive sample 14, the heat treatment temperature and the hardness after heat treatment are reference values, and the values of corrosion resistance test, etc. are results for test pieces which had not undergone heat treatment.

EXAMPLE 3

Figure 5:
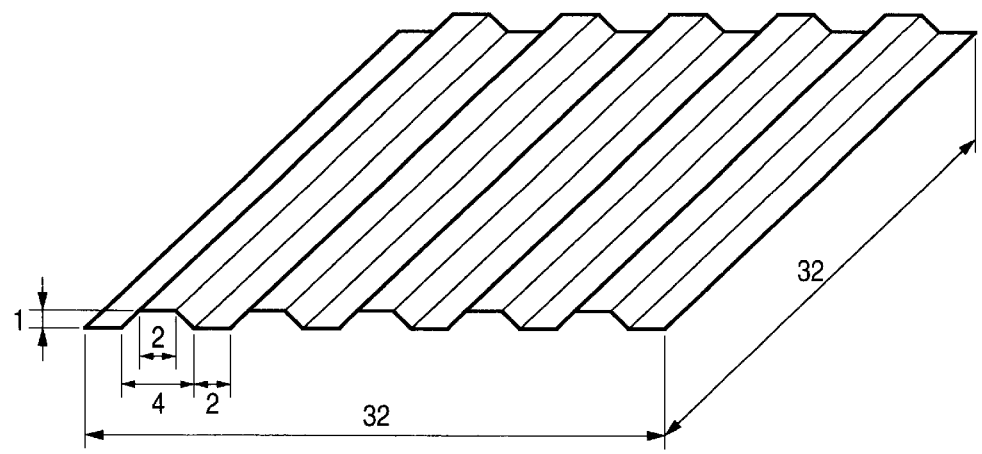
FIG. 5 is a slant view of metallic separators, for polymer electrolyte fuel cells (PEFC), produced in an Example according to the invention; each numeral in FIG. 5 indicates length (mm)

Inventive samples Nos. 6, 10, 14, 15, 19, and 20 obtained in Examples 1 and 2, which had been produced through cladding and had a noble-metal layer, were shaped by pressing to form grooves having a width of 2 mm and a depth of 1.0 mm with a pitch of 6 mm as shown in FIG. 5. Thus, metallic separators for polymer electrolyte fuel cells (PEFC) were produced which had dimensions of 32×32 mm. These metallic separators for polymer electrolyte fuel cells (PEFC) were used as test pieces to conduct a contact wich under a load of 235 N/cm$^2$ and the resultant voltage was measured to determine the contact electrical resistance.

(2) Corrosion Resistance Test

Two test pieces of the metallic separator for polymer electrolyte fuel cells (PEFC), which had dimensions of 32×32 mm, were place in the same vessel. In this vessel, 0.4 L of 0.1 wt % sulfuric acid solution (pH 2) was kept boiling with refluxing and the test pieces were held in this atmosphere for 168 hours. Thereafter, the metal ions which had been extracted with the solution were analyzed by atomic absorption spectrophotometry. The amounts thereof are expressed in terms of weight per liter of the solution.

TABLE 3

| | | Metal plate | | Coating film | | | | Contact electrical | Corrosion resistance test | | | |
|---|---|---|---|---|---|---|---|---|---|---|---|---|
| | | | Thickness | | Thickness | Draft | Peeling after | resistance | (mg/L) | | | |
| | No. | Material | (mm) | Material | (μm) | (%) | corrugation | (mΩ · cm$^2$) | Fe | Cr | Ni | Ti |
| Inventive | 24(6) | SUS430 | 0.3 | Au | 0.1 | 50 | not occurred | 7.7 | <0.01 | <0.01 | — | — |
| | 25(10) | SUS430 | 0.3 | Pt | 0.1 | 50 | not occurred | 9.9 | <0.01 | <0.01 | — | — |

TABLE 3-continued

| | No. | Metal plate Material | Thickness (mm) | Coating film Material | Thickness (μm) | Draft (%) | Peeling after corrugation | Contact electrical resistance (mΩ·cm²) | Corrosion resistance test (mg/L) Fe | Cr | Ni | Ti |
|---|---|---|---|---|---|---|---|---|---|---|---|---|
| sample | 26(14) | 80Ni—20Cr | 0.3 | Au | 0.1 | 50 | not occurred | 8.0 | — | <0.01 | <0.01 | — |
| | 27(15) | 80Ni—20Cr | 0.3 | Pt | 0.1 | 50 | not occurred | 9.6 | — | <0.01 | <0.01 | — |
| | 28(19) | pure Ti | 0.3 | Au | 0.1 | 50 | not occurred | 8.0 | — | — | — | <0.01 |
| | 29(20) | pure Ti | 0.3 | Pt | 0.1 | 50 | not occurred | 9.9 | — | — | — | <0.01 |

* The numeral in each parenthesis in the column "No." indicates the number of the inventive sample before corrugation.

EXAMPLE 4

Inventive sample No. 6 produced in Example 1 and inventive sample No. 14 produced in Example 2 were heated for 15 minutes at each of the heat treatment temperatures shown in Table 4 and then air-cooled to produce samples. Test pieces for a hardness test and corrosion resistance test were cut out of these samples. The metal plates were examined for surface hardness. A corrosion resistance test was conducted by the method used in Example 1. The results obtained are shown in Table 4 and FIG. 3 resistance of 9.0 mΩ·cm² or lower. Furthermore, in each of these samples, the amounts of nickel, chromium, and titanium extracted in the corrosion resistance test were less than 0.01 mg/L each.

In contrast, comparative sample No. 9, which had no noble-metal deposit (the metal plate was 80Ni-20Cr), had a contact electrical resistance of 18.2 mΩ·cm². In this sample, the amounts of nickel and chromium extracted in the corrosion resistance test were 0.14 mg/L and 0.01 mg/L, respectively.

TABLE 4

| | Inventive sample No. 6 | | Inventive sample No. 14 | | |
|---|---|---|---|---|---|
| Heat treatment temperature | Hardness after heat treatment | Corrosion resistance test (ions extracted) (mg/L) | Hardness after heat treatment | Corrosion resistance test (ions extracted) (mg/L) | |
| (° C.) | (HV) | Fe | Cr | (HV) | Ni | Cr |
| 25 | 266 | <0.01 | <0.01 | 255 | <0.01 | <0.01 |
| 100 | 265 | <0.01 | <0.01 | 257 | <0.01 | <0.01 |
| 200 | 267 | <0.01 | <0.01 | 255 | <0.01 | <0.01 |
| 300 | 260 | <0.01 | <0.01 | 254 | <0.01 | <0.01 |
| 400 | 259 | 0.01 | <0.01 | 246 | <0.01 | <0.01 |
| 500 | 204 | 0.02 | <0.01 | 199 | 0.01 | <0.01 |
| 600 | 172 | 0.05 | <0.01 | 179 | 0.01 | <0.01 |
| 700 | 159 | 0.08 | 0.01 | 175 | 0.03 | <0.01 |
| 800 | 151 | 0.17 | 0.01 | 177 | 0.07 | 0.01 |
| 900 | 150 | 0.35 | 0.02 | 173 | 0.14 | 0.01 |

Heat treatment period = 15 minutes

The results given in Table 1 show the following. The inventive samples were free from noble-metal layer peeling in the adhesion strength test and each had a contact electrical resistance of 9.0 mΩ·cm² or lower. Furthermore, the amounts of iron and chromium extracted from each of these samples in the corrosion resistance test were 0.13 mg/L or less and 0.01 mg/L or less, respectively.

In contrast, comparative sample No. 1, which had no noble-metal deposit, had a contact electrical resistance of 106 mΩ·cm². The amounts of iron and chromium extracted from this sample in the corrosion resistance test were 0.35 mg/L and 0.02 mg/L, respectively.

Furthermore, comparative samples Nos. 2 to 8, which had been produced through noble-metal plating but not undergone rolling, each suffered noble-metal layer peeling in the adhesion strength test. In each of these samples, the amounts of iron and chromium extracted in the corrosion resistance test were from 0.10 to 0.20 mg/L and 0.01 mg/L, respectively.

The results given in Table 2 show the following. The inventive samples were free from noble-metal layer peeling in the adhesion strength test and each had a contact electrical Comparative sample No. 17, which also had no noble-metal deposit (the metal plate was pure titanium), had a contact electrical resistance of 407 mΩ·cm². The amount of titanium extracted from this sample in the corrosion resistance test was less than 0.01 mg/L.

Furthermore, comparative samples Nos. 10 to 16 and 18 to 23, which had been produced through noble-metal plating but not undergone rolling, each suffered noble-metal peeling in the adhesion strength test. In each of these samples, the amounts of nickel, chromium, and titanium extracted in the corrosion resistance test were from 0.02 to 0.10 mg/L, 0.01 mg/L or less, and less than 0.01 mg/L, respectively.

The results given in Table 3 show the following. The inventive samples each were free from noble-metal layer peeling at corners even after the corrugation. In each of these samples, the contact electrical resistance did not change through the corrugation and remained low. Furthermore, the amounts of iron, chromium, nickel, and titanium extracted therefrom in the corrosion resistance test also did not change through the corrugation and remained small. These samples were hence satisfactory metallic separators for polymer electrolyte fuel cells (PEFC).

The results given in Table 4 and FIG. 2 show the following. In the case where the metal plate was SUS 430, the samples obtained through heat treatment at 700° C. and higher had almost the same hardness of 159 HV or lower, but the samples obtained through heat treatment at 800° C. and higher tended to have larger iron and chromium extraction amounts in the corrosion resistance test than comparative sample 2, which had undergone neither rolling nor heat treatment. Consequently, it was found that the heat treatment for that metal plate is preferably conducted at 700° C. or lower.

In the case where the metal plate was 80N-20Cr, the samples obtained through heat treatment at 600° C. and higher had almost the same hardness of 179 HV or lower, but the samples obtained through heat treatment at 800° C. and higher tended to have a larger nickel extraction amount in the corrosion resistance test than comparative sample 10, which had undergone neither rolling nor heat treatment. Consequently, it was found that the heat treatment for that metal plate is conducted preferably at 700° C. or lower, more preferably at 600° C. or lower.

EXAMPLES 5 TO 11 and
Comparative Examples 1 to 6

Metallic bases 202 made of a stainless steel (SUS 304L) and having a thickness of 1 mm were prepared as shown in Table 5. A thin gold layer 206 was deposited by plating on the surface of the metallic bases 202 in each of the thicknesses shown in Table 5. These plated bases were subjected to rolling for cladding (compression working) at the respective drafts (degrees of compression) shown in Table 5. Thus, corrosion-resistant metallic members 201 of Examples 5 to 11 were obtained.

On the other hand, the metallic bases 202 of Comparative Examples 1 to 6 were not subjected to the rolling. The thickness of the thin gold layer 206 in each corrosion-resistant metallic member after the rolling is shown in Table 5. The thickness of each thin layer 206 was determined by the fluorescent X-ray spectrometric method for measuring thickness (JIS H 8501).

Test pieces having dimensions of 40×50 mm were cut out respectively of the corrosion-resistant metallic members 201 of Examples 5 to 11 and of the metallic bases 202 of Comparative Examples 1 to 6. These test pieces were separately subjected to a corrosion test, in which a sulfuric acid solution having a pH of 2 was kept boiling with refluxing and each test piece was held in this solution (atmosphere) for 168 hours. Thereafter, the metal ions which had been extracted with the solution from the test piece of each Example were determined by atomic absorption spectrophotometry. The results obtained are shown in Table 5.

The test pieces which had undergone the corrosion test were subjected to a peeling test in accordance with JIS Z 0237 in the following manner. The test pieces were washed with ultrapure water, which was then replaced with acetone. Immediately after each test piece was dried, a pressure-sensitive adhesive tape 208 was applied to the surface of the thin layer 206 of the test piece and then stripped along the surface as shown in FIG. 6B.

The pressure-sensitive adhesive tape 208 used was a cellophane tape having a length of 50 mm and a width of 18 mm according to JIS Z 1522. It had an adhesive force of 1.08 N/cm or higher. The amount of the deposit peeled off, i.e., the amount (areal proportion) of the thin layer 206 which was transferred from the test piece to the tape 208, was measured with respect to each Example. The found values of the amount of deposit peeled off for the respective Examples are shown in Table 5, wherein the samples in which the amount of deposit peeled off was below 10% are indicated by ○ (good), those in which that amount was from 10 to 15% are indicated by Δ (slightly poor), and those in which that amount was above 15% are indicated by X (poor).

TABLE 5

| | Material of base | Method of thin layer deposition | Thin layer Material | Thin layer Thickness (nm) | Draft (%) | Thickness of Au after rolling (nm) | After corrosion test Amount peeled off (%) | Adhesion strength | Contact electrical resistance* | Ions extracted (mg/L) Fe | Cr | Ni |
|---|---|---|---|---|---|---|---|---|---|---|---|---|
| Ex. 5 | SUS304L | plating | Au | 50 | 5 | 47.5 | 8 | ○ | 5.8 | <0.01 | <0.01 | <0.01 |
| Ex. 6 | SUS304L | plating | Au | 50 | 10 | 45 | 3 | ○ | 6.0 | <0.01 | <0.01 | <0.01 |
| Ex. 7 | SUS304L | plating | Au | 50 | 20 | 40 | 0 | ○ | 6.3 | <0.01 | <0.01 | <0.01 |
| Ex. 8 | SUS304L | plating | Au | 50 | 40 | 30 | 0 | ○ | 6.5 | <0.01 | <0.01 | <0.01 |
| Ex. 9 | SUS304L | plating | Au | 50 | 60 | 20 | 0 | ○ | 6.8 | <0.01 | <0.01 | <0.01 |
| Ex. 10 | SUS304L | plating | Au | 50 | 80 | 10 | 0 | ○ | 7.3 | <0.01 | <0.01 | <0.01 |
| Ex. 11 | SUS304L | plating | Au | 50 | 90 | 5 | 0 | ○ | 7.5 | <0.01 | <0.01 | <0.01 |
| Comp. Ex. 1 | SUS304L | plating | Au | 50 | 0 | 50 | 100 | X | 90.5 | 0.31 | 0.02 | <0.01 |
| Comp. Ex. 2 | SUS304L | plating | Au | 100 | 0 | 100 | 100 | X | 90.2 | 0.31 | 0.02 | <0.01 |
| Comp. Ex. 3 | SUS304L | plating | Au | 200 | 0 | 200 | 76 | X | 15.3 | 0.09 | <0.01 | <0.01 |
| Comp. Ex. 4 | SUS304L | plating | Au | 300 | 0 | 300 | 46 | Δ | 10.5 | 0.08 | <0.01 | <0.01 |
| Comp. Ex. 5 | SUS304L | plating | Au | 400 | 0 | 400 | 12 | Δ | 10.3 | 0.04 | <0.01 | <0.01 |
| Comp. Ex. 6 | SUS304L | plating | Au | 500 | 0 | 500 | 0 | ○ | 5.8 | <0.01 | <0.01 | <0.01 |

*(mΩ · cm$^2$)

Test pieces having a thickness of 1 mm and a diameter of 16 mm were cut out respectively of the corrosion-resistant metallic members 201 of Examples 5 to 11 and of the gold-plated metallic bases 202 of Comparative Examples 1 to 6. These test pieces were examined for contact electrical resistance in the following manner. Each test piece was sandwiched between carbon papers. A current of 100 mA was caused to flow through the sandwich under a load of 245 N/cm² and the resultant voltage was measured. The contact resistance value was calculated from the voltage. The results obtained are also shown in Table 5.

Table 5 shows the following. In each of Examples 5 to 11, the amounts of ions of metals extracted were as small as 0.01 mg/L or less. In contrast, in Comparative Examples 1 to 5, the amounts of metal ions extracted, especially iron ions, were large. Although the amounts of metal ions extracted in Comparative Example 6 were the same as in Examples 5 to 11, this was due to the exceedingly large gold deposit thickness of 500 nm.

Table 5 further shows that the amounts of deposit peeled off in Examples 5 and 6 were 10% or less and that in Examples 7 to 11 was 0%, i.e., lower drafts resulted in a slight decrease in the amount of deposit peeled off.

Consequently, in all the corrosion-resistant metallic members of Examples 7 to 11, the thin gold layer 206 had high adhesion strength. Namely, the thin gold layer 206 in each of Examples 5 to 11 came to have a dense structure free from pinholes or the like according to the draft.

In contrast, the amount of deposit peeled of in Comparative Examples 1 and 2 was 100%, that in Comparative Example 3 was about 75%, that in Comparative Example 4 was about 45%, and that in Comparative Example 5 was about 10%. The amount of deposit peeled off in Comparative Example 6 only was 0%. Since the gold-plated materials of Comparative Examples 1 to 5 had undergone no working after the gold plating, peeling of the thin gold layer 206 occurred according to the thickness thereof. In Comparative Example 6, no peeling occurred because of the excessively thick deposit film, which leads to a cost increase.

Furthermore, the corrosion-resistant metallic members of Examples 5 to 11 each had a contact electrical resistance of 10 mΩ·cm² or lower, whereas the gold-plated materials of Comparative Examples 1 to 5 each had a contact electrical resistance higher than 10 mΩ·cm². Namely, the contact resistances in Examples 5 to 11 were on such a low level as to be comparable to that of pure gold regardless of the small thicknesses of the thin gold layers 206, which were 50 nm or less. In contrast, in Comparative Examples 1 to 6, the thickness of the gold deposit layer was inversely proportional to contact resistance. Deposit thicknesses of 400 nm or larger were required in the Comparative Examples for attaining the contact resistance level in Examples 5 to 11.

It was ascertained from those results that the corrosion-resistant metallic members 201 of Examples 5 to 11 had high corrosion resistance, high adhesion strength of the thin gold layer 206, and low contact electrical resistance. Furthermore, it can be easily understood that the effects of the invention were demonstrated.

TABLE 6

| | Material of base | Method of thin layer deposition | Thin layer | | | Thickness of Au, etc. after rolling (nm) | After corrosion test | | | Ions extracted (mg/L) | | | |
|---|---|---|---|---|---|---|---|---|---|---|---|---|---|
| | | | Material | Thickness (nm) | Draft (%) | | Amount peeled off (%) | Adhesion strength | Contact resistance *3 | Fe | Cr | Ni | Others |
| Ex. 12 | SUS430 | plating | Au | 50 | 50 | 25 | 0 | ○ | 6.8 | <0.01 | <0.01 | — | — |
| Ex. 13 | *1 | plating | Au | 50 | 50 | 25 | 0 | ○ | 6.8 | — | <0.01 | <0.01 | — |
| Ex. 14 | Ti | plating | Au | 100 | 90 | 10 | 0 | ○ | 7.3 | — | — | — | Ti < 0.01 |
| Ex. 15 | SUS304 | plating | Au | 50 | 50 | 25 | 0 | ○ | 6.8 | <0.01 | <0.01 | <0.01 | — |
| Ex. 16 | SUS316L | plating | Au | 50 | 50 | 25 | 0 | ○ | 6.8 | <0.01 | <0.01 | <0.01 | Mo < 0.01 |
| Ex. 17 | SUSXM7 | plating | Au | 50 | 50 | 25 | 0 | ○ | 6.8 | <0.01 | <0.01 | <0.01 | Cu < 0.01 |
| Ex. 18 | Al | plating | Au | 100 | 50 | 50 | 0 | ○ | 6.3 | — | — | — | Al < 0.01 |
| Ex. 19 | SUS304L | plating | Pd | 50 | 50 | 25 | 0 | ○ | 7.5 | <0.01 | <0.01 | <0.01 | — |
| Ex. 20 | SUS304L | plating | Pt | 50 | 50 | 25 | 0 | ○ | 7.3 | <0.01 | <0.01 | <0.01 | — |
| Ex. 21 | SUS304L | plating | *2 | 50 | 50 | 25 | 0 | ○ | 6.5 | <0.01 | <0.01 | <0.01 | — |
| Ex. 22 | SUS304L | vapor deposition | Au | 20 | 80 | 4 | 0 | ○ | 8.0 | <0.01 | <0.01 | <0.01 | — |
| Ex. 23 | SUS304L | vapor deposition | Au | 20 | 90 | 2 | 0 | ○ | 8.3 | 0.03 | <0.01 | <0.01 | — |
| Ex. 24 | SUS304L | vapor deposition | Au | 10 | 90 | 1 | 0 | ○ | 9.3 | 0.08 | <0.01 | <0.01 | — |
| Comp. Ex. 7 | SUS304L | vapor deposition | Au | 20 | 0 | 20 | 100 | X | 89.6 | 0.33 | 0.02 | <0.01 | — |
| Comp. Ex. 8 | SUS304L | vapor deposition | Au | 5 | 90 | 0.5 | 0 | ○ | 37.0 | 0.30 | 0.02 | <0.01 | — |

*1 Ni—20 wt % Cr
*2 Au—0.2 wt % Co
*3 (mΩ · cm²)

EXAMPLES 12 to 24 and
Comparative Examples 7 and 8

Corrosion-resistant metallic members 201 of Examples 12 to 24 and Comparative Examples 7 and 8 were obtained in the same manner as in the Examples shown in Table 5, except that gold, palladium, platinum, or an AU—Co alloy was deposited by plating or vapor deposition on a 1 mm-thick metallic base 202 made of a stainless steel (SUS 430, SUS 304, SUS 304L, SUS 316L, or SUS XM7), an Ni—Cr alloy, pure titanium, or pure aluminum. These metallic members are shown in Table 6.

Test pieces of the two sizes shown above were cut out of each of the corrosion-resistant metallic members 201. The test pieces each were subjected to the corrosion test to determine the amounts of metal ions extracted and to the peeling test to determine the amount of deposit peeled off. The test pieces were further subjected to the contact electrical resistance test. The results obtained are shown in Table 6.

Table 6 shows the following. In each of Examples 12 to 24, the amounts of ions of metals extracted were small as in the Examples shown in Table 5. The amount of deposit peeled off in all these Examples was 0%, and the contact resistances therein were all 10 m$\Omega$·cm$^2$ or less.

In contrast, in Comparative Example 7, the amounts of metal ions extracted were large, the amount of deposit peeled off was 100%, and the contact resistance was as high as 89.6 m$\Omega$·cm$^2$. Such results were obtained because the corrosion-resistant metallic member of Comparative Example 7 had undergone no working after the vapor deposition of a thin gold layer and hence had pinholes and pores therein.

In Comparative Example 8, the amounts of metal ions extracted were large as in Comparative Example 7 but the amount of deposit peeled off was as small as 0%. The contact resistance therein was as high as about 37.0 m$\Omega$·cm$^2$. It was thought that since the corrosion-resistant metallic member of Comparative Example 8 was produced by vapor-depositing a thin gold layer of 5 nm and rolling the gold layer at a draft as high as 90% to reduce the thickness thereof to as small as 0.5 nm, the surface of the metallic base 202 (substrate) was locally exposed and this resulted in the increased contact resistance and the increased amounts of metal ions extracted.

As described above, the corrosion-resistant metallic members 201 obtained in Examples 12 to 24, which had a thin coating layer of gold or another noble metal, were also ascertained to have high corrosion resistance, high adhesion strength of the thin layer 206 of gold or the like, and low contact electrical resistance. Furthermore, it can be easily understood that the effects of the invention were demonstrated.

Production of Corrosion-resisitant Member

EXAMPLE 25

A thin gold layer having a thickness of 50 nm was formed by plating on each side of a 0.5 mm-thick metallic plate material made of SUS 304L. This plate material having the thin gold layer was compression-worked with pressure rolls at a degree of compression of 15% and then subjected to shaping to form a feed opening, passage, and discharge opening for a fuel gas comprising H$_2$. Finally, the shaped plate was immersed in 34 wt % aqueous H$_2$O$_2$ solution at 25° C. for 60 minutes to conduct an anticorrosive treatment. Thus, a corrosion-resistant metallic member for use as a fuel cell separator was obtained.

EXAMPLES 26 TO 51

Corrosion-resistant metallic members were produced in the same manner as in Example 25, except that one or more factors selected from the material of the metal plate, technique for forming a thin noble-metal layer, thickness and material of the layer, degree of compression, and conditions for the anticorrosive treatment were changed as shown in Table 7. Production conditions for the corrosion-resistant metallic member produced in each Example are summarized in Table 7.

Comparative Example 9

A thin gold layer having a thickness of 50 nm was formed by plating on each side of a 0.5 mm-thick metallic plate material made of SUS 304L. This plate material having the thin gold layer was subjected to the same shaping as in Example 25 to produce a corrosion-resistant metallic member for use as a fuel cell separator. In this Comparative Example, compression working and an anticorrosive treatment were not conducted.

Comparative Examples 10 and 11

Corrosion-resistant metallic members were produced in the same manner as in Comparative Example 9, except that the thickness of the thin gold layer was changed as shown in Table 8.

Comparative Example 12

A thin gold layer having a thickness of 50 nm was formed by plating on each side of a 0.5 mm-thick metallic plate material made of SUS 304L. This plate material having the thin gold layer was compression-worked with rolls at a degree of compression of 30% and then subjected to the same shaping as in Example 25 to produce a corrosion-resistant metallic member for use as a fuel cell separator. In this Comparative Example, an anticorrosive treatment was not conducted.

Comparative Example 13

A corrosion-resistant metallic member was produced in the same manner as in Comparative Example 12, except that the degree of compression of the thin gold layer was changed as shown in Table 8.

Comparative Example 14

A thin gold layer having a thickness of 50 nm was formed by plating on each side of a 0.5 mm-thick metallic plate material made of SUS 304L. This plate material having the thin gold layer was subjected to the same shaping as in Example 25. Subsequently, the shaped plate was immersed in 34 wt % aqueous H$_2$O$_2$ solution at 25° C. for 60 minutes to conduct an anticorrosive treatment. Thus, a corrosion-resistant metallic member for use as a fuel cell separator was obtained. In this Comparative Example, compression working was not conducted.

Comparative Example 15

A corrosion-resistant metallic member was produced in the same manner as in Comparative Example 14, except that conditions for the anticorrosive treatment were changed as shown in Table 8.

Comparative Example 16

A thin gold layer having a thickness of 50 nm was formed by plating on each side of a 0.5 mm-thick metallic plate material made of SUS 304L. This plate material having the thin gold layer was compression-worked with rolls at a degree of compression of 50% and then subjected to the same shaping as in Example 25. Finally, the shaped plate was immersed in 60 wt % aqueous HNO$_3$ solution at 25° C. for 60 minutes to conduct an anticorrosive treatment. Thus, a corrosion-resistant metallic member for use as a fuel cell separator was obtained.

Comparative Examples 17 to 21

Corrosion-resistant metallic members were produced in the same manner as in Comparative Example 16, except that conditions for the anticorrosive treatment were changed as shown in Table 8. Production conditions for the corrosion-resistant metallic member produced in each of the Comparative Examples given above are summarized in Table 8.

TABLE 7

| | *1 | Method of formation | Material | T$_0$ (nm) | T$_1$ (nm) | Degree of compression (%) | *2 | Solvent | Concentration (*3) | Temperature (° C.) | Period (min) |
|---|---|---|---|---|---|---|---|---|---|---|---|
| Ex. 25 | SUS304L | plating | Au | 50 | 42.5 | 15 | A-1 | H$_2$O | 34 | 25 | 60 |
| Ex. 26 | SUS304L | plating | Au | 50 | 35 | 30 | A-1 | H$_2$O | 34 | 25 | 60 |
| Ex. 27 | SUS304L | plating | Au | 50 | 25 | 50 | A-1 | H$_2$O | 34 | 25 | 60 |
| Ex. 28 | SUS304L | plating | Au | 50 | 25 | 50 | A-1 | H$_2$O | 17 | 25 | 60 |
| Ex. 29 | SUS304L | plating | Au | 50 | 25 | 50 | A-1 | H$_2$O | 9 | 25 | 60 |
| Ex. 30 | SUS304L | plating | Au | 50 | 25 | 50 | A-1 | H$_2$O | 5 | 25 | 60 |
| Ex. 31 | SUS304L | plating | Au | 50 | 25 | 50 | A-1 | H$_2$O | 5 | 60 | 60 |
| Ex. 32 | SUS304L | plating | Au | 50 | 25 | 50 | A-1 | B-1 | 5 | 80 | 60 |
| Ex. 33 | SUS304L | plating | Au | 50 | 25 | 50 | A-1 | B-2 | 5 | 80 | 60 |
| Ex. 34 | SUS304L | plating | Au | 50 | 25 | 50 | A-2 | B-1 | 10 | 5 | 60 |
| Ex. 35 | SUS304L | plating | Au | 50 | 25 | 50 | A-3 | H$_2$O | 10 | 5 | 60 |
| Ex. 36 | SUS304L | plating | Au | 50 | 25 | 50 | A-4 | H$_2$O | 10 | 5 | 60 |
| Ex. 37 | SUS304L | plating | Au | 50 | 25 | 50 | A-5 | H$_2$O | 10 | 5 | 60 |
| Ex. 38 | SUS304L | plating | Au | 50 | 25 | 50 | A-6 | H$_2$O | 10 | 5 | 60 |
| Ex. 39 | SUS304L | plating | Au | 50 | 25 | 50 | A-7 | H$_2$O | 10 | 5 | 60 |
| Ex. 40 | SUS304L | plating | Au | 50 | 25 | 50 | A-8 | H$_2$O | 10 | 5 | 60 |
| Ex. 41 | SUS304L | plating | Au | 50 | 25 | 50 | A-9 | H$_2$O | 2 | 5 | 60 |
| Ex. 42 | SUS316L | plating | Au | 50 | 25 | 50 | A-1 | H$_2$O | 34 | 25 | 60 |
| Ex. 43 | SUSXM7 | plating | Au | 50 | 25 | 50 | A-1 | H$_2$O | 34 | 25 | 60 |
| Ex. 44 | SUS430 | plating | Au | 50 | 25 | 50 | A-1 | H$_2$O | 34 | 25 | 60 |
| Ex. 45 | SUS304 | plating | Au | 50 | 25 | 50 | A-1 | H$_2$O | 34 | 25 | 60 |
| Ex. 46 | Ni—20Cr | plating | Au | 50 | 25 | 50 | A-1 | H$_2$O | 34 | 25 | 60 |
| Ex. 47 | pure Al | plating | Au | 100 | 50 | 50 | A-1 | H$_2$O | 34 | 25 | 60 |
| Ex. 48 | pure Ti | plating | Au | 100 | 50 | 50 | A-1 | H$_2$O | 34 | 25 | 60 |
| Ex. 49 | SUS304L | plating | Pt | 50 | 25 | 50 | A-1 | H$_2$O | 34 | 25 | 60 |
| Ex. 50 | SUS304L | plating | AuCo | 50 | 35 | 30 | A-1 | H$_2$O | 34 | 25 | 60 |
| Ex. 51 | SUS304L | sputtering | Au | 50 | 25 | 50 | A-1 | H$_2$O | 34 | 25 | 60 |

TABLE 8

| | *1 | Method of formation | Material | T$_0$ (nm) | T$_1$ (nm) | Degree of compression (%) | *2 | Solvent | Concentration (*3) | Temperature (° C.) | Period (min) |
|---|---|---|---|---|---|---|---|---|---|---|---|
| Comp. Ex. 9 | SUS304L | plating | Au | 50 | — | — | — | — | — | — | — |
| Comp. Ex. 10 | SUS304L | plating | Au | 200 | — | — | — | — | — | — | — |
| Comp. Ex. 11 | SUS304L | plating | Au | 1000 | — | — | — | — | — | — | — |
| Comp. Ex. 12 | SUS304L | plating | Au | 50 | 35 | 30 | — | — | — | — | — |
| Comp. Ex. 13 | SUS304L | plating | Au | 50 | 25 | 50 | — | — | — | — | — |
| Comp. Ex. 14 | SUS304L | plating | Au | 50 | — | — | A-1 | H$_2$O | 34 | 25 | 60 |
| Comp. Ex. 15 | SUS304L | plating | Au | 50 | — | — | A-1 | H$_2$O | 34 | 80 | 60 |
| Comp. Ex. 16 | SUS304L | plating | Au | 50 | 25 | 50 | a-1 | H$_2$O | 60 | 25 | 60 |
| Comp. Ex. 17 | SUS304L | plating | Au | 50 | 25 | 50 | a-1 | H$_2$O | 30 | 25 | 60 |
| Comp. Ex. 18 | SUS304L | plating | Au | 50 | 25 | 50 | a-1 | H$_2$O | 6 | 25 | 60 |
| Comp. Ex. 19 | SUS304L | plating | Au | 50 | 25 | 50 | a-1 | H$_2$O | 30 | 40 | 60 |
| Comp. Ex. 20 | SUS304L | plating | Au | 50 | 25 | 50 | a-1 | H$_2$O | 30 | 60 | 30 |
| Comp. Ex. 21 | SUS304L | plating | Au | 50 | 25 | 50 | a-1 | H$_2$O | 30 | 80 | 10 |

The meanings of symbols used in Tables 7 and 8 are as follows.
*1: material of metallic base
*2: kind of peroxide
*3: wt %
A-1: H$_2$O$_2$
T$_0$: thickness before compression working
T$_1$: thickness after compression working A-2: $BaO_2$
A-3: $Na_2O_2$
A-4: $(NH_4)_2S_2O_8$
A-5: $K_4P_2O_8$
A-6: $Na_2CO_4$
A-7: $NaBO_3$
A-8: $CO(NH_2)_2 \cdot H_2O_2$
A-9: $O_3$
a-1: $HNO_3$
B-1: aqueous $H_2SO_4$ solution having pH of 2
B-2: aqueous NaOH solution having pH of 10

Evaluation of Corrosion-resisitant Metallic Members Produced

The corrosion-resistant metallic members produced in the Examples and Comparative Examples given above were examined for corrosion resistance and contact electrical resistance by the following methods. The results obtained for the Examples and those for the Comparative Examples are summarized in Tables 9 and 10, respectively.

Corrosion Resistance

A corrosion test was conducted in accordance with JIS H 8620 in the following manner. One liter of 63% aqueous $HNO_3$ solution was placed in the bottom of a desiccator. Test pieces cut out of the corrosion-resistant metallic members were suspended over the solution so as to be located at a height of 5 cm above the liquid level, and the cover was put on the desiccator. The 63% aqueous $HNO_3$ solution was aerated for 2 hours. Thereafter, the test pieces were taken out of the desiccator and examined with an optical microscope at a magnification of 10 diameters to count pinholes per $cm^2$. This number of pinholes (per $cm^2$) was taken as a measure of corrosion resistance.

Contact Electrical Resistance

Test pieces cut out of the corrosion-resistant metallic members each were sandwiched between carbon papers. A current of 100 mA was caused to flow through each sandwich under a load of 2.5 MPa and the resultant voltage was measured to determine the contact electrical resistance ($m\Omega \cdot cm^2$)

TABLE 9

|  | Number of pinhole (per $cm^2$) | Contact electrical resistance ($m\Omega \cdot cm^2$) |
| --- | --- | --- |
| Example 25 | 4 | 6.6 |
| Example 26 | 1 | 6.1 |
| Example 27 | 0 | 6.0 |
| Example 28 | 0 | 6.1 |
| Example 29 | 4 | 6.5 |
| Example 30 | 8 | 6.8 |
| Example 31 | 1 | 6.1 |
| Example 32 | 1 | 6.1 |
| Example 33 | 1 | 6.0 |
| Example 34 | 8 | 7.3 |
| Example 35 | 6 | 6.8 |
| Example 36 | 2 | 6.3 |
| Example 37 | 2 | 6.3 |
| Example 38 | 3 | 6.6 |
| Example 39 | 3 | 6.5 |
| Example 40 | 1 | 6.1 |
| Example 41 | 0 | 6.4 |

TABLE 9-continued

|  | Number of pinhole (per $cm^2$) | Contact electrical resistance ($m\Omega \cdot cm^2$) |
| --- | --- | --- |
| Example 42 | 0 | 6.2 |
| Example 43 | 0 | 6.0 |
| Example 44 | 8 | 6.9 |
| Example 45 | 3 | 6.4 |
| Example 46 | 7 | 6.9 |
| Example 47 | 8 | 6.9 |
| Example 48 | 0 | 6.0 |
| Example 49 | 8 | 6.8 |
| Example 50 | 2 | 6.3 |
| Example 51 | 5 | 6.8 |

TABLE 10

|  | Number of pinhole (per $cm^2$) | Contact electrical resistance ($m\Omega \cdot cm^2$) |
| --- | --- | --- |
| Comp. Ex. 9 | 120 | 5.9 |
| Comp. Ex. 10 | 43 | 5.8 |
| Comp. Ex. 11 | 27 | 5.7 |
| Comp. Ex. 12 | 15 | 5.9 |
| Comp. Ex. 13 | 11 | 5.9 |
| Comp. Ex. 14 | 42 | 6.2 |
| Comp. Ex. 15 | 19 | 6.0 |
| Comp. Ex. 16 | 52 | 21 |
| Comp. Ex. 17 | 42 | 18 |
| Comp. Ex. 18 | 22 | 14 |
| Comp. Ex. 19 | gold film peeling | 27 |
| Comp. Ex. 20 | gold film peeling | 86 |
| Comp. Ex. 21 | gold film peeling | 98 |

As apparent from the results given in Tables 9 and 10, the corrosion-resistant metallic members of the Examples had sufficiently low contact electrical resistances and considerably small numbers of pinholes after the corrosion test as compared with the corrosion-resistant metallic members of the Comparative Examples and were free from gold film peeling. These results show that the metallic members of the Examples had a high degree of corrosion resistance. Consequently, the corrosion-resistant metallic members according to the invention are useful especially as fuel cell separators.

Production of Corrosion-resistant members

EXAMPLE 52

A thin gold layer having a thickness of 50 nm was formed by plating on each side of a 0.5 mm-thick metallic plate material made of SUS 304L. This plate material having the thin gold layer was compression-worked with pressure rolls at a degree of compression of 5% and then subjected to shaping to form a feed opening, passage, and discharge opening for a fuel gas comprising $H_2$. Finally, the shaped plate was introduced into a plasma generator and oxidized therein at 25° C. for 120 seconds in a plasma atmosphere having an oxygen gas pressure of $1.33 \times 10^2$ Pa (1 Torr) and a power density of 0.32 W/$cm^2$. Thus, a corrosion-resistant metallic member for use as a fuel cell separator was obtained.

EXAMPLES 53 TO 73

Corrosion-resistant metallic members were produced in the same manner as in Example 52, except that one or more factors selected from the material of the metal plate, technique for forming a thin noble-metal layer, thickness and material of the layer, degree of compression, and conditions for and mode of the anticorrosive treatment were changed as shown in Table 11. Production conditions for the corrosion-resistant metallic member produced in each Example are summarized in Table 11.

Comparative Example 22

A thin gold layer having a thickness of 50 nm was formed by plating on each side of a 0.5 mm-thick metallic plate material made of SUS 304L. This plate material having the thin gold layer was subjected to the same shaping as in Example 52 to produce a corrosion-resistant metallic member for use as a fuel cell separator. In this Comparative Example, compression working and an anticorrosive treatment were not conducted.

Comparative Examples 23 and 24

Corrosion-resistant metallic members were produced in the same manner as in Comparative Example 22, except that the thickness of the thin gold layer was changed as shown in Table 12.

Comparative Example 25

A thin gold layer having a thickness of 50 nm was formed by plating on each side of a 0.5 mm-thick metallic plate material made of SUS 304L. This plate material having the thin gold layer was compression-worked with pressure rolls at a degree of compression of 30% and then subjected to the same shaping as in Example 52 to produce a corrosion-resistant metallic member for use as a fuel cell separator. In this Comparative Example, an anticorrosive treatment was not conducted.

Comparative Example 26

A corrosion-resistant metallic member was produced in the same manner as in Comparative Example 25, except that the degree of compression of the thin gold layer was changed as shown in Table 12.

Comparative Example 27

A thin gold layer having a thickness of 50 nm was formed by plating on each side of a 0.5 mm-thick metallic plate material made of SUS 304L. This plate material having the thin gold layer was subjected to the same shaping as in Example 52. Subsequently, the shaped plate was introduced into a plasma generator and oxidized under the same conditions as in Example 52. Thus, a corrosion-resistant metallic member for use as a fuel cell separator was obtained. In this Comparative Example, compression working was not conducted.

Comparative Example 28

A corrosion-resistant metallic member was produced in the same manner as in Comparative Example 27, except that the period of the anticorrosive treatment was changed as shown in Table 12. Production conditions for the corrosion-resistant metallic member produced in each of the Comparative Examples given above are summarized in Table 12.

TABLE 11

| | | Thin noble-metal layer | | | | | Anticorrosive treatment | | | |
|---|---|---|---|---|---|---|---|---|---|---|
| | *1 | Method of formation | Material | $T_0$ (nm) | $T_1$ (nm) | Degree of compression (%) | *2 | Gas pressure (*3) | Power density (W/cm$^2$) | Period (sec) | Temperature (° C.) |
| Ex. 52 | SUS304L | plating | Au | 50 | 47.5 | 5 | $O_2$ | 1 | 0.32 | 120 | 25 |
| Ex. 53 | SUS304L | plating | Au | 50 | 42.5 | 15 | $O_2$ | 1 | 0.32 | 120 | 25 |
| Ex. 54 | SUS304L | plating | Au | 50 | 35 | 30 | $O_2$ | 1 | 0.32 | 120 | 25 |
| Ex. 55 | SUS304L | plating | Au | 50 | 25 | 50 | $O_2$ | 1 | 0.32 | 120 | 25 |
| Ex. 56 | SUS304L | plating | Au | 50 | 35 | 30 | $O_2$ | 1 | 0.32 | 120 | 100 |
| Ex. 57 | SUS304L | plating | Au | 50 | 35 | 30 | $O_2$ | 1 | 0.32 | 120 | 200 |
| Ex. 58 | SUS304L | plating | Au | 50 | 35 | 30 | $O_2$ | 1 | 0.32 | 120 | 300 |
| Ex. 59 | SUS304L | plating | Au | 50 | 35 | 30 | $N_2$ | 1 | 0.32 | 120 | 200 |
| Ex. 60 | SUS304L | plating | Au | 50 | 35 | 30 | $CF_4$ | 1 | 0.32 | 120 | 200 |
| Ex. 61 | SUS304L | plating | Au | 50 | 35 | 30 | $O_3$ | 760 | — | 360 | 100 |
| Ex. 62 | SUS304L | plating | Au | 50 | 35 | 30 | $O_3$ | 760 | — | 360 | 200 |
| Ex. 63 | SUS304L | plating | Au | 50 | 35 | 30 | $O_3$ | 760 | — | 360 | 300 |
| Ex. 64 | SUS316L | plating | Au | 50 | 35 | 30 | $O_2$ | 1 | 0.32 | 120 | 100 |
| Ex. 65 | SUSXM7 | plating | Au | 50 | 35 | 30 | $O_2$ | 1 | 0.32 | 120 | 100 |
| Ex. 66 | SUS430 | plating | Au | 50 | 35 | 30 | $O_2$ | 1 | 0.32 | 120 | 100 |
| Ex. 67 | SUS304 | plating | Au | 50 | 35 | 30 | $O_2$ | 1 | 0.32 | 120 | 100 |
| Ex. 68 | Ni20%Cr | plating | Au | 50 | 35 | 30 | $O_2$ | 1 | 0.32 | 120 | 100 |
| Ex. 69 | Al | plating | Au | 50 | 35 | 30 | $O_2$ | 1 | 0.32 | 120 | 100 |
| Ex. 70 | Ti | plating | Au | 50 | 35 | 30 | $O_2$ | 1 | 0.32 | 120 | 100 |
| Ex. 71 | SUS304L | plating | Pt | 50 | 35 | 30 | $O_2$ | 1 | 0.32 | 120 | 100 |
| Ex. 72 | SUS304L | plating | AuCo | 50 | 35 | 30 | $O_2$ | 1 | 0.32 | 120 | 100 |
| Ex. 73 | SUS304L | sputtering | Au | 50 | 35 | 30 | $O_2$ | 1 | 0.32 | 240 | 100 |

TABLE 12

| | *1 | Method of formation | Thin noble-metal layer | | | Degree of compression (%) | Anticorrosive treatment | | | | |
|---|---|---|---|---|---|---|---|---|---|---|---|
| | | | Material | $T_0$ (nm) | $T_1$ (nm) | | *2 | Gas pressure (*3) | Power density (W/cm$^2$) | Period (sec) | Temperature (° C.) |
| Comp. Ex. 22 | SUS304L | plating | Au | 50 | — | — | — | — | — | — | — |
| Comp. Ex. 23 | SUS304L | plating | Au | 200 | — | — | — | — | — | — | — |
| Comp. Ex. 24 | SUS304L | plating | Au | 1000 | — | — | — | — | — | — | — |
| Comp. Ex. 25 | SUS304L | plating | Au | 50 | 35 | 30 | — | — | — | — | — |
| Comp. Ex. 26 | SUS304L | plating | Au | 50 | 25 | 50 | — | — | — | — | — |
| Comp. Ex. 27 | SUS304L | plating | Au | 50 | — | — | $O_2$ | 1 | 0.32 | 120 | 25 |
| Comp. Ex. 28 | SUS304L | plating | Au | 50 | — | — | $O_2$ | 1 | 0.32 | 240 | 25 |

The meanings of symbols used in Tables 11 and 12 are as follows.

*1: material of metallic base
*2: kind of working gas
*3: ×133 Pa
$T_0$: thickness before compression working
$T_1$: thickness after compression working Evaluation of Corrosion-resistant Metallic Members Produced The corrosion-resistant metallic members produced in the Examples and Comparative Examples given above were examined for corrosion resistance and contact electrical resistance by the same methods as described above. The results obtained for the Examples and those for the Comparative Examples are summarized in Tables 13 and 14, respectively.

TABLE 13

| | Number of pinhole (per cm$^2$) | Contact electrical resistance (mΩ · cm$^2$) |
|---|---|---|
| Example 52 | 6 | 6.1 |
| Example 53 | 4 | 6.2 |
| Example 54 | 2 | 6.4 |
| Example 55 | 1 | 6.6 |
| Example 56 | 0 | 6.4 |
| Example 57 | 0 | 7.0 |
| Example 58 | 1 | 8.5 |
| Example 59 | 4 | 6.7 |
| Example 60 | 3 | 6.5 |
| Example 61 | 5 | 6.8 |
| Example 62 | 1 | 6.9 |
| Example 63 | 0 | 7.3 |
| Example 64 | 0 | 6.5 |
| Example 65 | 2 | 6.6 |
| Example 66 | 1 | 6.9 |
| Example 67 | 4 | 6.8 |
| Example 68 | 3 | 7.2 |
| Example 69 | 2 | 6.9 |
| Example 70 | 2 | 6.8 |
| Example 71 | 5 | 9.1 |
| Example 72 | 2 | 7.0 |
| Example 73 | 4 | 6.7 |

TABLE 14

| | Number of pinhole (per cm$^2$) | Contact electrical resistance (mΩ · cm$^2$) |
|---|---|---|
| Comp. Ex. 22 | 120 | 5.9 |
| Comp. Ex. 23 | 43 | 5.8 |
| Comp. Ex. 24 | 27 | 5.7 |
| Comp. Ex. 25 | 15 | 5.9 |
| Comp. Ex. 26 | 11 | 5.9 |
| Comp. Ex. 27 | 34 | 6.1 |
| Comp. Ex. 28 | 20 | 6.4 |

As apparent from the results given in Tables 13 and 14, the corrosion-resistant metallic members of the Examples had sufficiently low contact electrical resistances and considerably small numbers of pinholes after the corrosion test as compared with the corrosion-resistant metallic members of the Comparative Examples. These results show that the metallic members of the Examples had a high degree of corrosion resistance. Consequently, the corrosion-resistant metallic members according to the invention are useful especially as fuel cell separators.

The invention should not be construed as being limited to the embodiments and Examples described above.

For example, the metallic base is not limited to the flat ones described above, and examples thereof include materials having a nearly angular section, channel-shaped materials, and materials having a corrugated section.

The base material may also be a composite plate composed of plate materials superposed on each other made of different metals or alloys, or may be a composite member composed of sections superposed on each other.

Furthermore, applications of the corrosion-resistant metallic member of the invention should not be construed as being limited to the separators, and include various electrical/electronic materials, structural members for chemical apparatus or chemical plants, parts for marine plants, structural building or interior members, and various decorative articles.

Due to the constitution described above, the highly corrosion-resistant material of the invention produces the following excellent effects. The material has almost the same adhesion strength as clad metals and has improved corrosion resistance because the porous structure of the noble-metal layer has been densified and pinholes have been filled up. Furthermore, the improvement in corrosion resistance enables the noble-metal layer to be thinner, leading to a cost reduction.

The process of the invention for producing a highly corrosion-resistant material brings about an effect that due to the constitution described above, it can yield a highly corrosion-resistant material having those excellent properties.

The corrosion-resistant metallic member of the invention described above has high corrosion resistance, low contact electrical resistance, and suitability for mass production because the thin noble-metal layer deposited on the front/back side thereof is adherent to the metallic base at high adhesion strength.

Since the thin noble-metal layer can be denser and thinner than in corrosion-resistant metallic members heretofore in use, it can impart high corrosion resistance and contribute to a cost reduction.

Furthermore, the corrosion-resistant metallic member can be one in which the thin noble-metal layer deposited on the metallic base can have a dense structure having high adhesion strength and free from pinholes, pores, or the like.

The metallic separator for polymer electrolyte fuel cells (PEFC) of the invention produces the following excellent effects due to the constitution described above. It has low contact resistance and has almost the same adhesion strength as clad metals. Since the porous structure of the noble-metal layer has been densified and pinholes have been filled up, the separator has improved corrosion resistance. The improvement in corrosion resistance enables the noble-metal layer to be thinner and the separator to be less expensive.

The process of the invention for producing a metallic separator for polymer electrolyte fuel cells (PEFC) brings about an effect that due to the constitution described above, it can yield a metallic separator for polymer electrolyte fuel cells (PEFC) which has those excellent properties.

Moreover, the metallic separator for fuel cells of the invention combines high corrosion resistance and low constant electrical resistance and is suitable for mass production, because the thin noble-metal layer has been deposited on the front/back side of the metallic base at high adhesion strength.

The separator can be one in which the thin noble-metal layer has been deposited on the front/back side of the metallic base so as to have a dense structure which attains high adhesion strength and high corrosion resistance.

As apparent from the descriptions given above, the invention has the effect that a metallic member having a high degree of corrosion resistance can be provided with simple production apparatus and there are no particular limitations on the material of the metal to be used as the base. The invention further has a secondary effect that exposed edge parts can be simultaneously protected against corrosion.

While the invention has been described in detail and with reference to specific embodiments thereof, it will be apparent to one skilled in the art that various changes and modifications can be made therein without departing from the scope thereof.

What is claimed is:

1. A corrosion-resistant metallic member which comprises a metallic base and a thin noble-metal layer deposited on at least part of the metallic base, having been subjected to compression working to reduce the total thickness of the base and the thin layer by 1% or more; and wherein the corrosion-resistant metallic member has been subjected to an anticorrosive treatment selected from the group consisting of an anticorrosive treatment with a liquid phase containing a peroxide and ozone, and an anticorrosive treatment with an active gas atmosphere.

2. The corrosion-resistant metallic member of claim 1, which has been formed into a given shape, the forming having been conducted after the compression working and before the anticorrosive treatment or conducted after the anticorrosive treatment.

3. The corrosion-resistant metallic member of claim 1, which has undergone an anticorrosive treatment with an acid or alkaline liquid phase containing a peroxide or ozone.

4. The corrosion-resistant metallic member of claim 3, wherein the peroxide is hydrogen peroxide.

5. The corrosion-resistant metallic member of claim 1, which has undergone an anticorrosive treatment with the liquid phase at a temperature lower than the boiling point of the solvent constituting the liquid phase.

6. The corrosion-resistant metallic member of claim 1, which has undergone an anticorrosive treatment with an atmosphere of a plasma of a working gas or with an ozone gas atmosphere.

7. The corrosion-resistant metallic member of claim 1, which has undergone the anticorrosive treatment at a temperature of 300° C. or lower.

8. A process for producing a corrosion-resistant metallic member which comprises the steps of:

depositing at least one noble metal on at least part of a metallic base to form a thin noble-metal layer;

compressing the resultant noble-metal-coated metallic material to reduce the total thickness of the base and the thin layer by 1% or more; and treating the corrosion-resistant metallic member with either an anticorrosive treatment with a liquid phase containing a peroxide or ozone, and an anticorrosive treatment with an active gas atmosphere.

9. The process for producing a corrosion-resistant metallic member of claim 8, which further includes the step of forming into a given shape, the forming step being conducted after the compression working and before the anticorrosive treatment or conducted after the anticorrosive treatment.

10. The process for producing a corrosion-resistant metallic member of claim 9, wherein the anticorrosive treatment is conducted with an acid or alkaline liquid phase containing a peroxide or ozone.

11. The process for producing a corrosion-resistant metallic member of claim 10, wherein the peroxide is hydrogen peroxide.

12. The process for producing a corrosion-resistant metallic member of claim 8, wherein the anticorrosive treatment in the liquid phase is conducted at a temperature lower than the boiling point of the solvent constituting the liquid phase.

13. The process for producing a corrosion-resistant metallic member of claim 8, wherein the anticorrosive treatment is conducted with an atmosphere of a plasma of a working gas or with an ozone gas atmosphere.

14. The process for producing a corrosion-resistant metallic member of claim 8, wherein the anticorrosive treatment is conducted at a temperature of 300° C. or lower.

* * * * *